United States Patent
Logan et al.

(10) Patent No.: US 9,500,075 B2
(45) Date of Patent: Nov. 22, 2016

(54) MEASUREMENT WHILE DRILLING FLUID PRESSURE PULSE GENERATOR

(71) Applicant: Evolution Engineering Inc., Calgary (CA)

(72) Inventors: Aaron W. Logan, Calgary (CA); Justin C. Logan, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 14/440,189

(22) PCT Filed: Nov. 6, 2013

(86) PCT No.: PCT/CA2013/050849
§ 371 (c)(1),
(2) Date: May 1, 2015

(87) PCT Pub. No.: WO2014/071519
PCT Pub. Date: May 15, 2014

(65) Prior Publication Data
US 2015/0247403 A1    Sep. 3, 2015

Related U.S. Application Data

(60) Provisional application No. 61/723,140, filed on Nov. 6, 2012.

(51) Int. Cl.
*E21B 47/18*    (2012.01)
*E21B 47/14*    (2006.01)
(Continued)

(52) U.S. Cl.
CPC ............. *E21B 47/18* (2013.01); *E21B 17/042* (2013.01); *E21B 47/01* (2013.01); *E21B 47/187* (2013.01); *F16D 1/101* (2013.01)

(58) Field of Classification Search
CPC ........ E21B 47/14; E21B 47/16; E21B 47/18; F16D 1/10; F16D 1/101; F16D 1/108; F16D 1/112
USPC ........... 464/162, 180, 182, 82, 83, 179, 901; 367/82.84; 340/854.4, 855, 4; 181/106
See application file for complete search history.

(56) References Cited

U.S. PATENT DOCUMENTS 2,288,425 A * 6/1942 Simborg ............... B21B 35/145
464/33
2,487,449 A   12/1944 Knudson
(Continued)

FOREIGN PATENT DOCUMENTS

CA    2082488 A1    5/1993
CA    2551316 A1    12/2007
(Continued)

*Primary Examiner* — Kenneth L Thompson
(74) *Attorney, Agent, or Firm* — Seed IP Law Group LLP

(57) ABSTRACT

A coupling key for fixedly coupling a driveshaft to a rotating component of a measurement while drilling telemetry apparatus comprises a key body and at least one zero backlash ring. The key body has dimensions selected to fit within a keyhole of a driveshaft and a receptacle of a rotating component, with a gap that is large enough that the key body can be freely inserted into the keyhole and receptacle and small enough that the coupling body can couple the driveshaft to the rotating component in a rotational direction. The least one zero backlash ring extends around the key body and protrudes from surfaces of the key body and into the gap such that an interference fit is established between the coupling key, the keyhole, and the receptacle when the coupling key is coupling the driveshaft and rotating component together.

22 Claims, 24 Drawing Sheets

(51) Int. Cl.
  *F16D 1/112* (2006.01)
  *E21B 17/042* (2006.01)
  *E21B 47/01* (2012.01)
  *F16D 1/10* (2006.01)

(56) References Cited

U.S. PATENT DOCUMENTS

| | | | | |
|---|---|---|---|---|
| 2,700,131 | A * | 1/1955 | Alder | E21B 47/18 137/236.1 |
| 3,705,603 | A * | 12/1972 | Hawk | E21B 47/18 137/624.14 |
| 3,792,429 | A * | 2/1974 | Patton | E21B 47/182 367/84 |
| 3,815,380 | A * | 6/1974 | Esmay | B01F 3/0857 403/349 |
| 3,949,354 | A * | 4/1976 | Claycomb | E21B 41/0085 367/84 |
| 4,630,244 | A * | 12/1986 | Larronde | E21B 47/18 166/374 |
| 4,914,637 | A * | 4/1990 | Goodsman | E21B 47/18 367/83 |
| 5,085,295 | A | 2/1992 | Wautelet et al. | |
| 5,787,052 | A | 7/1998 | Gardner et al. | |
| 6,050,349 | A | 4/2000 | Rountree et al. | |
| 6,585,088 | B1 | 7/2003 | Fontaine et al. | |
| 6,714,138 | B1 | 3/2004 | Turner et al. | |
| 7,395,883 | B2 * | 7/2008 | Beccu | E21B 17/076 173/104 |
| 7,735,579 | B2 * | 6/2010 | Gopalan | E21B 47/187 175/40 |
| 8,147,228 | B2 * | 4/2012 | Guidry, Jr. | F04C 13/008 403/355 |
| 8,251,160 | B2 | 8/2012 | Gopalan et al. | |
| 2006/0214814 | A1 * | 9/2006 | Pringnitz | E21B 47/12 340/855.4 |
| 2007/0137899 | A1 | 6/2007 | Beccu | |
| 2011/0049789 | A1 * | 3/2011 | Kato | B65H 1/14 271/162 |

FOREIGN PATENT DOCUMENTS

| | | |
|---|---|---|
| CN | 201650272 U | 11/2010 |
| CN | 102425411 A | 4/2012 |
| DE | 19939262 C1 | 11/2000 |
| EP | 2428687 A1 | 3/2012 |
| GB | 2486811 A | 6/2012 |
| WO | 2007/033126 A2 | 3/2007 |
| WO | 2012/125246 A2 | 9/2012 |

* cited by examiner

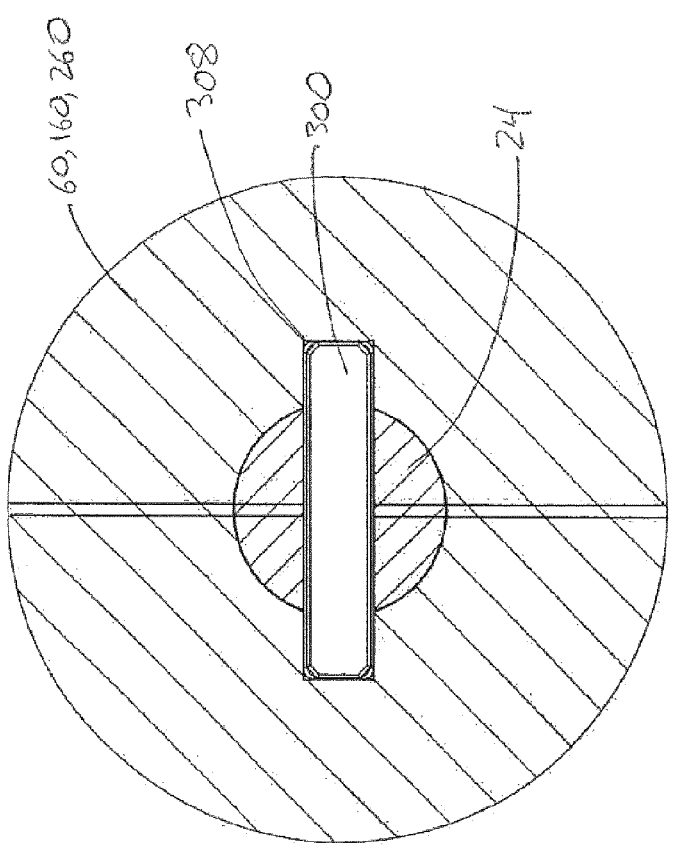

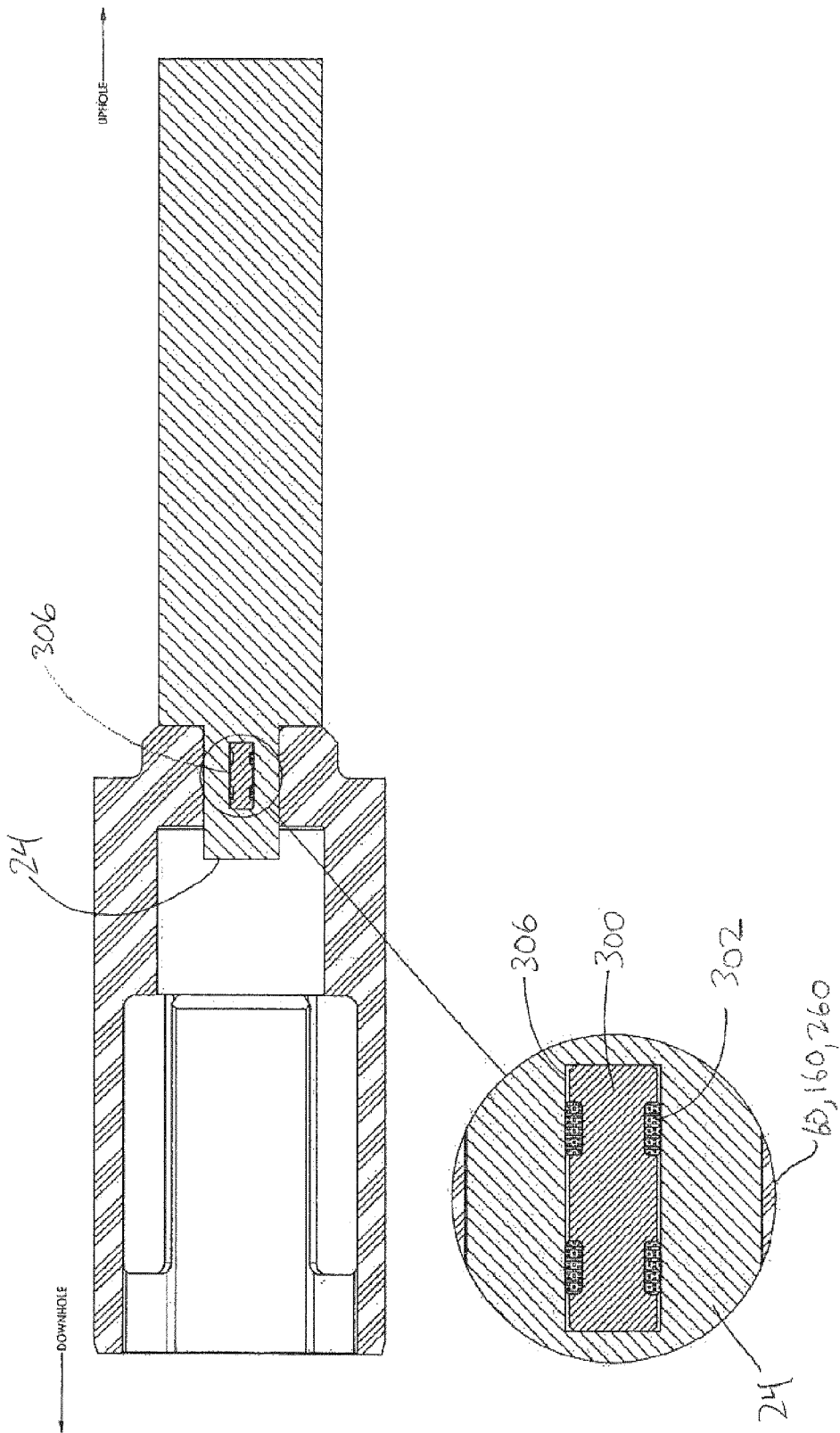

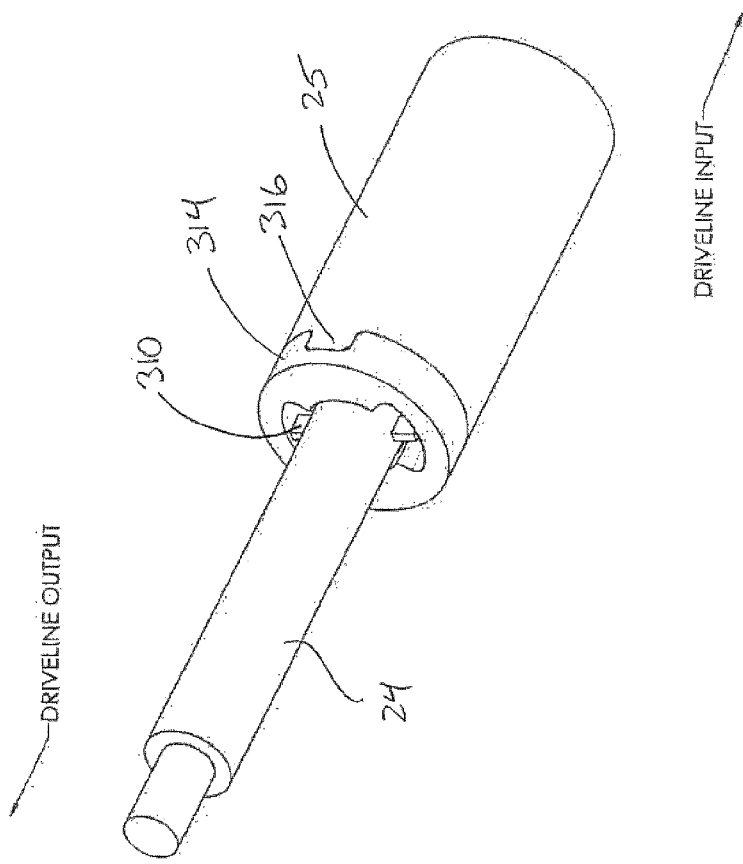

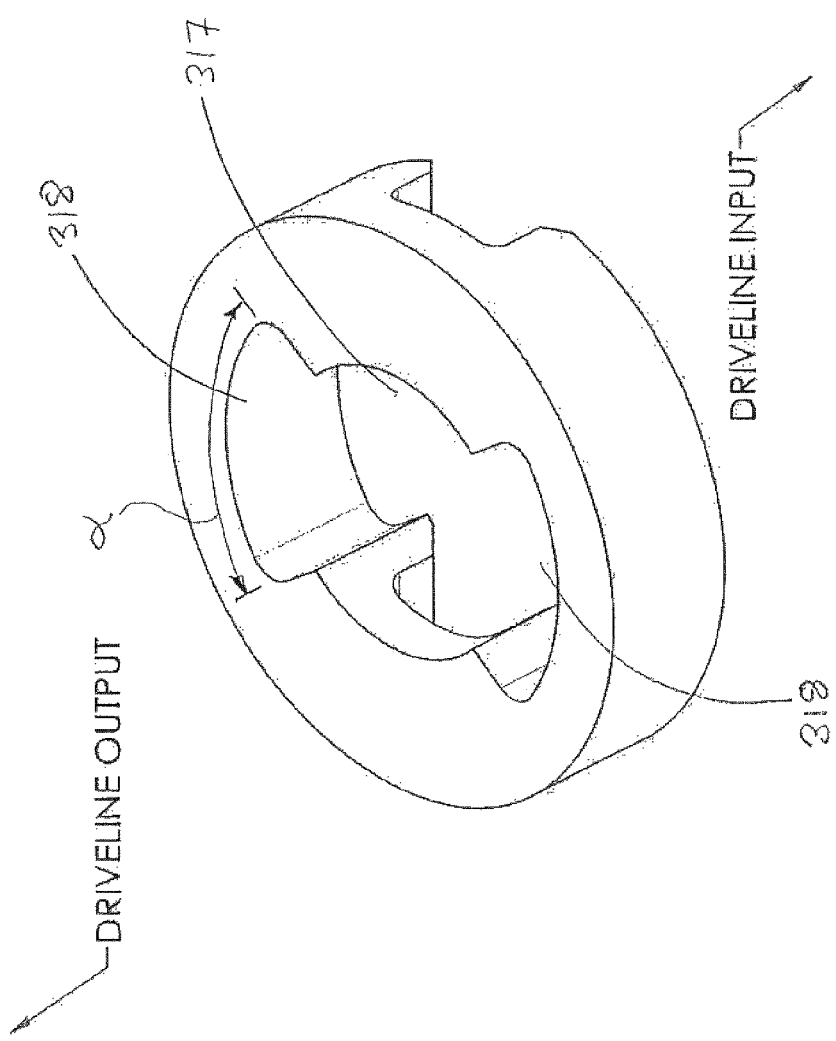

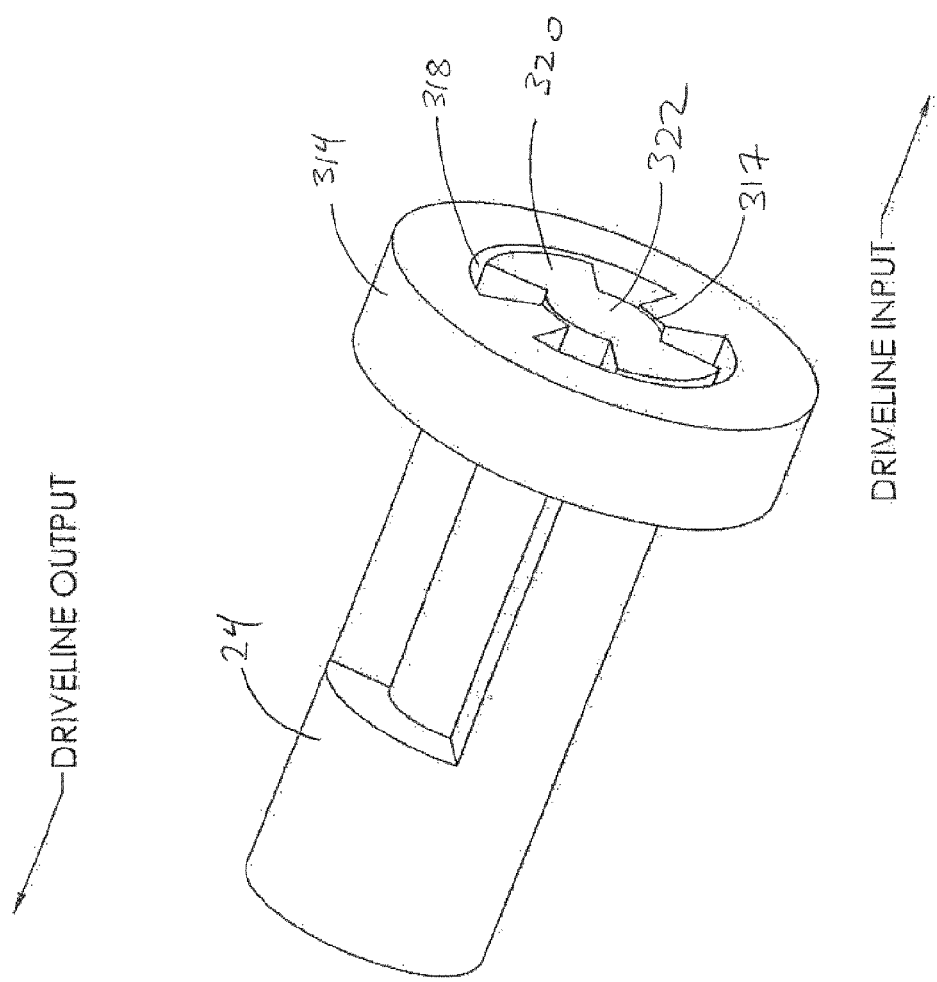

MEASUREMENT WHILE DRILLING FLUID PRESSURE PULSE GENERATOR

FIELD

This disclosure relates generally to a fluid pressure pulse generator and method of using same and more particularly to a fluid pressure pulse generator comprising a stator and rotor for use in measurement while drilling using mud pulse or pressure pulse telemetry.

BACKGROUND

The recovery of hydrocarbons from subterranean zones relies on the process of drilling wellbores. This process includes drilling equipment situated at surface and a drill string extending from the surface equipment to the formation or subterranean zone of interest. The drill string can extend thousands of feet or meters below the surface. The terminal end of the drill string includes a drill bit for drilling, or extending, the wellbore. The process also relies on some sort of drilling fluid system, in most cases a drilling "mud". The mud is pumped through the inside of the drill string, which cools and lubricates the drill bit and then exits out of the drill bit and carries rock cuttings back to surface. The mud also helps control bottom hole pressure and prevents hydrocarbon influx from the formation into the wellbore and potential blow out at the surface.

Directional drilling is the process of steering a well from vertical to intersect a target endpoint or to follow a prescribed path. At the terminal end of the drill string is a bottom hole assembly (BHA) which may include 1) the drill bit; 2) steerable downhole mud motor of a rotary steerable system; 3) sensors of survey equipment for logging while drilling (LWD) and/or measurement while drilling (MWD) to evaluate downhole conditions as drilling progresses; 4) apparatus for telemetry of data to surface; and 5) other control equipment such as stabilizers or heavy weight drill collars. The BHA is conveyed into the wellbore by a string of metallic tubulars known as the drill string. MWD equipment may be used to provide downhole sensor and status information at the surface while drilling in a near real-time mode. This information is used by the rig crew to make decisions about controlling and steering the well to optimize the drilling speed and trajectory based on numerous factors, including lease boundaries, existing wells, formation properties, hydrocarbon size and location. These decisions can include making intentional deviations from the planned wellbore path as necessary, based on the information gathered from the downhole sensors during the drilling process. In its ability to obtain real time data, MWD allows for a relatively more economical and efficient drilling operation.

In known MWD systems, the MWD tools typically contain the same sensor package to survey the well bore, but various telemetry methods may be used to send the data back to the surface. Such telemetry methods include, but are not limited to, the use of hardwired drill pipe, acoustic telemetry, use of fibre optic cable, mud pulse (MP) telemetry and electromagnetic (EM) telemetry.

MP Telemetry involves creating pressure pulses in the circulating drill mud in the drill string. Mud is circulated from the surface to downhole using positive displacement pumps. The resulting flow rate of mud is typically constant. Pressure pulses are generated by changing the flow area and/or flow path of the drilling mud as it passes the MWD tool in a timed, coded sequence, thereby creating pressure differentials in the drilling mud. The pressure pulses act to transmit data utilizing a number of encoding schemes. These schemes may include amplitude phase shift keying (ASK), frequency shift keying (FSK), phase shift keying (PSK), or a combination of these techniques.

The pressure differentials or pulses may either be negative pulses or positive pulses. Valves that open and close a bypass mud stream from inside the drill pipe to the wellbore annulus create a negative pressure pulse. All negative pulsing valves need a high differential pressure below the valve to create a sufficient pressure drop when the valve is open; this results in the negative valves being more prone to washing. With each actuation, the valve hits against the valve seat to ensure it completely closes the bypasses and this impact can lead to mechanical and abrasive wear and failure. Valves that use a controlled restriction within the circulating mud stream create a positive pressure pulse. Some valves are hydraulically powered to reduce the required actuation power typically resulting in a main valve indirectly operated by a pilot valve. The pilot valve closes a flow restriction which actuates the main valve to create a pressure increase.

A number of different valves are currently used to create positive pressure pulses. In a typical rotary or rotating disc valve pulser, a control circuit activates a motor (e.g. a brushless, DC electric motor) that rotates a "windowed restrictor" or rotor, relative to a fixed housing (stator) to allow (open the window) or restrict (close the window) fluid flow through the restrictor. It is the variable alignment of the rotor and stator that produces the 'windows of fluid flow', and the movement between aligned (open) and misaligned (closed) that produces the pressure pulses. The rotor is rotated either continuously in one direction (mud siren), incrementally by oscillating the rotor in one direction and then back to its original position, or incrementally in one direction only, so that the rotor blades increase or decrease the amount by which they obstruct the windows in the stator. As the rotor rotates, it partially blocks a portion of the window, fluid becomes restricted causing a change in pressure over time. Generally, mud pulse valves are capable of generating discrete pulses at a predetermined frequency by selective restriction of the mud flow.

Rotary pulsers are typically actuated by means of a torsional force applicator which rotates the rotor a short angular distance to either open or close the pulser, with the rotor returning to its start position in each case. Motor speed changes are required to change the pressure pulse frequency. Various parameters can affect the mud pulse signal strength and rate of attenuation such as original signal strength, carrier frequency, depth between surface transducer and downhole modulator, internal diameter of the drill pipe, density and viscosity of the drilling fluid, volumetric flow rate of drilling mud, and flow area of window. Rotary valve pulsers require an axial gap between the stator and rotor of the modulator to provide a flow area for drilling mud, even when the valve is in the "closed" position. As a result the rotary pulser is never completely closed as the drilling mud must maintain a continuous flow for satisfactory drilling operations to be conducted. The size of the gap is dictated by previously mentioned parameters, and a skilled technician is required to set the correct gap size and to calibrate the pulser.

Another type of valve is a "poppet" or reciprocating pulser where the valve opens and closes against an orifice positioned axially against the flow stream. Some have permanent magnets to keep the valve in an open position. The permanent magnet is opposed by a magnetizing coil powered by the MWD tool to release the poppet to close the valve.

U.S. Pat. No. 8,251,160, issued Aug. 28, 2012, (incorporated by reference) discloses an example of a MP apparatus and method of using same. It highlights a number of examples of various types of MP generators, or "pulsers", which are familiar to those skilled in the art. U.S. Pat. No. 8,251,160 describes a rotor/stator design with windows in the rotor which align with windows in the stator. The stator also has a plurality of circular openings for flow of fluid therethrough. In a first orientation, the windows in the stator and the rotor align to create a fluid flow path orthogonal to the windows through the rotor and stator in addition to a fluid flow path through the circular openings in the stator. In this fashion the circulating fluid flows past and through the stator on its way to the drill bit without any significant obstruction to its flow. In the second orientation, the windows in the stator and the rotor do not align and there is restriction of fluid flow as the fluid can only flow through the circular holes in the stator. This restriction creates a positive pressure pulse which is transmitted to the surface and decoded.

Advantages of MP telemetry include increased depth capability, no dependence on earth formation, and current strong market acceptance. Disadvantages include many moving parts, difficulty with lost circulation material (LCM) usage, generally slower baud rates, narrower bandwidth, and incompatibility with air/underbalanced drilling which is a growing market in North America. The latter is an issue as the signals are substantially degraded if the drilling fluid inside the drill pipe contains substantial quantities of gas. MP telemetry also suffers when there are very low flow rates of mud, as low mud flow rates may result in too low a pressure differential to produce a strong enough signal at the surface. There are also a number of disadvantages of current MP generators, that include limited speed of response and recovery, jamming due to accumulation of debris which reduces the range of motion of the valve, failure of the bellows seal around the servo-valve activating shaft, failure of the rotary shaft seal, failure of drive shaft components, flow erosion, fatigue, and difficulty accesses and replacing small parts.

SUMMARY

According to one aspect of the invention, there is provided a coupling key for fixedly coupling a driveshaft to a rotating component of a measurement while drilling telemetry apparatus. The driveshaft has a keyhole configured to receive a portion of the coupling key and comprises a bore extending from a side of the driveshaft and at least partially through the driveshaft. The rotating component has a receptacle configured to axially receive the driveshaft and a portion of the coupling key protruding outwardly from the driveshaft keyhole. The coupling key comprises a key body and at least one zero backlash ring. The key body has dimensions selected to fit within the keyhole and receptacle with a gap that is large enough that the key body can be freely inserted into the keyhole and receptacle and small enough that the coupling body can couple the driveshaft to the rotating component in a rotational direction. The least one zero backlash ring extends around the key body and protrudes from surfaces of the key body and into the gap such that an interference fit is established between the coupling key, the keyhole, and the receptacle when the coupling key is coupling the driveshaft and rotating component together.

The coupling key can further comprise at least one groove that extends around the key body in which case the at least one zero backlash ring is seated in the groove with a portion of the zero backlash ring protruding outwardly from the groove. The dimension of the zero backlash ring protruding from the surfaces of the key body cam be larger than the gap. The zero backlash ring can be composed of a thermoplastic material that is elastically deformable and which swells in the presence of heat or moisture or both heat and moisture, whereby the zero backlash ring can compress to permit the coupling key to be inserted into the keyhole and receptacle and expand to form the interference fit after the coupling key has been inserted into the keyhole and receptacle.

Alternatively, the zero backlash key can be composed of a material that is plastically deformable, or a material that is shearable. In either, case, the zero backlash ring can be composed of a material which also swells in the presence of heat or moisture or both heat and moisture.

In yet another alternative, the dimension of the zero backlash ring protruding from the surfaces of the key body can be the same size as the gap and the zero backlash ring can be composed of a material which swells in the presence of heat or moisture or both heat and moisture.

According to another aspect of the invention, there is provided a measurement while drilling telemetry apparatus comprising a pulser assembly comprising a motor, a driveshaft rotationally coupled to the motor, and sensor and motor control equipment communicative with the motor; a fluid pressure pulse generator comprising a stator for fixedly coupling to a landing sub, and a rotor; and a driveline coupling key fixedly coupling the driveshaft to the rotor. The driveshaft comprises a keyhole configured to receive a portion of the coupling key and comprising a bore extending from a side of the driveshaft and at least partially through the driveshaft. The rotating component comprises a receptacle configured to axially receive the driveshaft and a portion of the coupling key protruding outwardly from the driveshaft keyhole. The driveline coupling key comprises: a key body having dimensions selected to fit within the keyhole and receptacle with a gap that is large enough that the key body can be freely inserted into the keyhole and receptacle and small enough that the key body can couple the driveshaft to the rotating component in a rotational direction; and at least one zero backlash ring extending around the key body and protruding from surfaces of the key body and into the gap such that an interference fit is established between the coupling key, the keyhole, and the receptacle when the coupling key is coupling the driveshaft and rotating component together.

According to yet another embodiment of the invention, there is provided a measurement while drilling telemetry apparatus comprising:

(a) a pulser assembly comprising: a housing; a motor fixedly coupled to the housing; a driveshaft rotationally coupled to the motor; sensor and motor control equipment communicative with the motor; and a mechanical stop sub-assembly comprising: a collar fixedly coupled to the housing and at least one indexer protruding from a side of the driveshaft, the collar comprising an angular movement restrictor window with a central window segment which axially and rotatably receives the driveshaft, and an indexing window segment in communication with the central window segment and which receives the indexer, the central window segment having an angular span across which the indexer can be oscillated by the driveshaft; and (b) a fluid pressure pulse generator comprising a stator for affixing to a landing sub, and a rotor fixedly attached to the driveshaft such that the angular span of the indexing window segment defines the angular range of the rotor's angular movement relative to the stator.

The angular movement restrictor window can comprises a pair of opposed indexing window segments and a pair of opposed indexers each extending from the driveshaft into a respective indexing window segment.

The indexer can be a coupling key coupling the driveshaft to a gearbox of the motor; in which case, the driveshaft has a keyhole and the gearbox has a receptacle, and the coupling key has a key body with dimensions which extend through the keyhole and receptacle and into indexing window segment. The coupling key can comprise at least one zero backlash ring extending around the key body and protruding from surfaces of the key body and into a gap in between the key body and the keyhole and receptacle, such that an interference fit is established between the coupling key, the keyhole, and the receptacle when the coupling key is coupling the driveshaft and gearbox together.

Instead of the indexer being a coupling key, the indexer and driveshaft can be integrally formed from the same piece; in particular, the driveshaft can comprise a first driveshaft portion having a first diameter and second driveshaft portion having a second diameter smaller than the first diameter. The indexer extends from the second driveshaft portion and the central window segment is configured to receive the second driveshaft portion.

The sensor and motor control equipment can comprises a processor and a memory having encoded thereon instructions executable by the processor to oscillate the driveshaft between an angular range defined by contact of the indexer with each side of the window indexing segment, and to position the driveshaft at a rotor start position that is a midpoint between each side of the window indexing segment.

According to yet another aspect of the invention there is provided a mechanical stop sub-assembly for a pulser assembly of a measurement while drilling telemetry apparatus. The sub-assembly comprises: a collar fixedly mountable to a housing of the pulser assembly; and at least one indexer fixedly mountable to a driveshaft of the pulser assembly such that a portion of the at least one indexer protrudes from a side of the driveshaft. The collar comprises an angular movement restrictor window with a central window segment for axially and rotatably receiving the driveshaft, and an indexing window segment in communication with the central window segment and which receives the protruding indexer portion when the driveshaft is being received by the central window segment. The indexing window segment has an angular span across which the indexer can be oscillated by the driveshaft. The angular span is selected to define an angular range of a rotor's angular movement relative to a stator, wherein the rotor and stator are part of a fluid pressure pulse generator of the measurement while drilling telemetry apparatus and the rotor is affixed to the driveshaft.

According to yet another aspect of the invention, there is provided a method for positionally calibrating a rotor relative to a stator of a fluid pressure pulse generator of a measurement while drilling telemetry apparatus, wherein the stator is fixedly attached to a landing sub and the rotor is fixedly attached to a driveshaft of a pulser assembly, the driveshaft being rotatable within a housing of the pulser assembly and having at least one indexer protruding from a side of the driveshaft and into an indexing window segment of an angular movement restrictor window that is fixed relative to the housing, the indexing window segment having an angular span across which the indexer can be oscil-lated by the driveshaft. The method comprises: rotating the driveshaft such that the indexer contacts a side of the indexing window segment representing one end of the angular span; determining a calibration position of the indexer by selecting an angular position that is a selected angular distance from the contacted side of the indexing window segment; and positioning the indexer at the calibration position by rotating the indexer from the contacted side of the window segment by the selected angular distance. The calibration position can be the midpoint of the angular span, and the selected angular distance is half the angular span.

BRIEF DESCRIPTION OF FIGURES

FIG. 20 is an axial sectioned view of the drive shaft and fluid pressure pulse generator coupled by the coupling key.

FIG. 21 is a side sectioned view of the drive shaft and fluid pressure pulse generator coupled by the coupling key.

FIG. 22 is a perspective view of components of the pulser assembly comprising the drive shaft and a rotating sub assembly with a first embodiment of a mechanical stop sub-assembly.

FIG. 23 is a perspective view of a collar of the mechanical stop sub-assembly.

FIG. 24 is a perspective view of a second embodiment of the mechanical stop sub-assembly.

DETAILED DESCRIPTION

The embodiments described herein generally relate to a fluid pressure pulse generator for generating pressure pulses in fluid. The fluid pressure pulse generator of the embodiments described herein may be used for mud pulse (MP) telemetry used in downhole drilling. The fluid pressure pulse generator may alternatively be used in other methods where it is necessary to generate a fluid pressure pulse.

Figure 1:
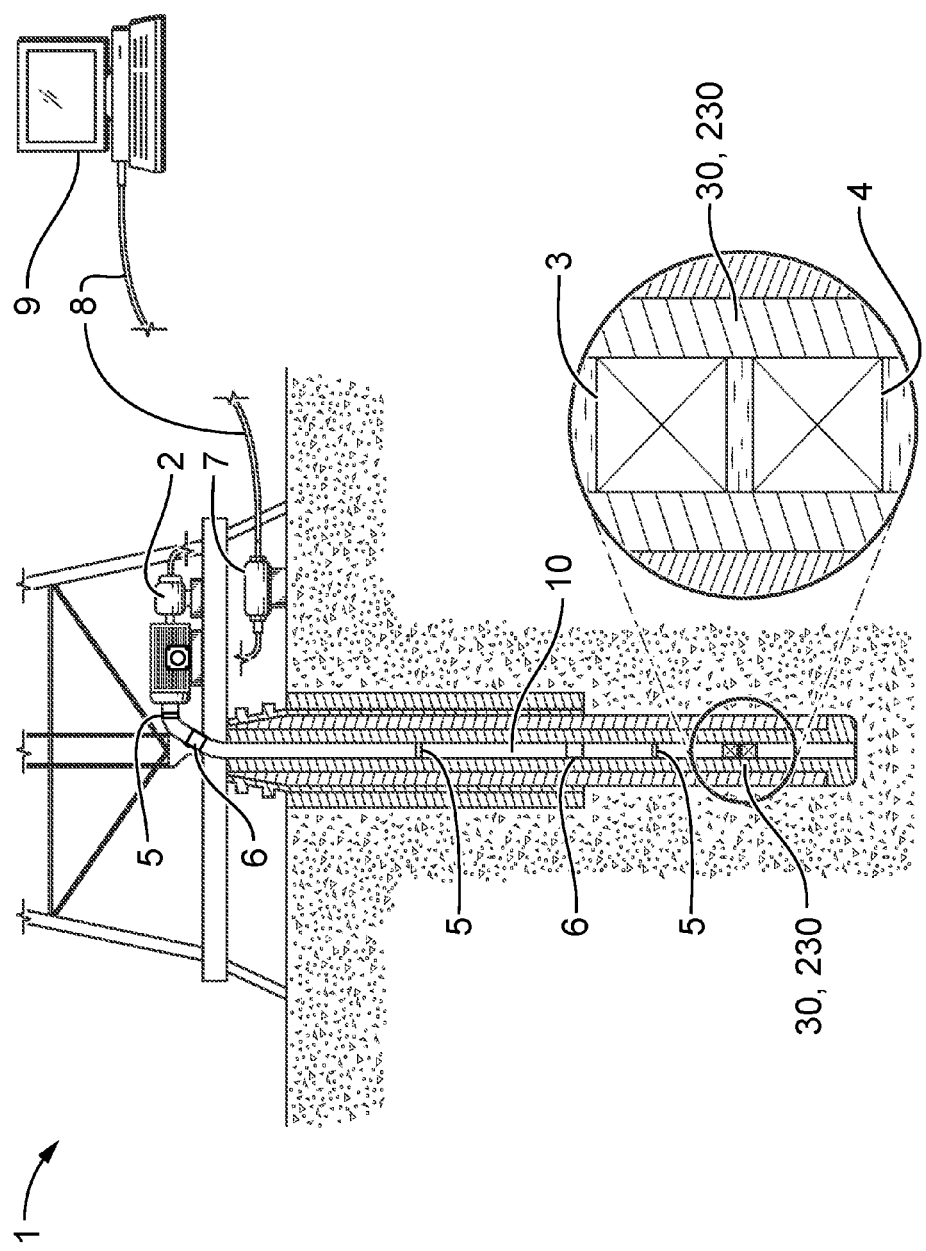
FIG. 1 is a schematic of a mud pulse (MP) telemetry method used in downhole drilling in which embodiments of the invention can be employed.

Referring to the drawings and specifically to FIG. 1, there is shown a schematic representation of a MP telemetry method using the fluid pressure pulse generator embodiments of the invention. In downhole drilling equipment 1, drilling fluid or "mud" is pumped down a drill string by pump 2 and passes through a measurement while drilling (MWD) tool. The MWD tool includes a fluid pressure pulse generator 30, 230 according to embodiments of the invention. The fluid pressure pulse generator 30, 230 has a reduced flow configuration (schematically represented as valve 3) which generates a full positive pressure pulse (represented schematically as full pressure pulse 6) and an intermediate flow configuration (schematically represented as valve 4) which generates an intermediate positive pressure pulse (represented schematically as intermediate pressure pulse 5). Intermediate pressure pulse 5 is reduced compared to the full pressure pulse 6. Information acquired by downhole sensors (not shown) is transmitted in specific time divisions by the pressure pulses 5, 6 in mud column 10. More specifically, signals from sensor modules (not shown) are received and processed in a data encoder in a bottom hole assembly (not shown) where the data is digitally encoded as is well established in the art. A controller then actuates the fluid pressure pulse generator 30, 230 to generate pressure pulses 5, 6 which contain the encoded data. The pressure pulses 5, 6 are transmitted to the surface and detected by a pressure transducer 7. The measured pressure pulses are transmitted as electrical signals through transducer cable 8 to a surface computer 9 which decodes and displays the transmitted information to the drilling operator.

The characteristics of the pressure pulses 5, 6 are defined by amplitude, duration, shape, and frequency, and these characteristics are used in various encoding systems to represent binary data. The ability to produce two different sized pressure pulses 5, 6, allows for greater variation in the binary data being produced and therefore quicker and more accurate interpretation of downhole measurements.

One or more signal processing techniques are used to separate undesired mud pump noise, rig noise or downward propagating noise from upward MWD signals. The data transmission rate is governed by Lamb's theory for acoustic waves in a drilling mud and is about 1.1 to 1.5 km/s. The fluid pressure pulse generator 30, 230 must operate in an unfriendly environment under high static downhole pressures, high temperatures, high flow rates and various erosive flow types. The fluid pressure pulse generator 30, 230 generates pulses between 100-300 psi and typically operates in a flow rate as dictated by the size of the drill pipe bore, and limited by surface pumps, drill bit total flow area (TFA), and mud motor/turbine differential requirements for drill bit rotation.

Figure 2:
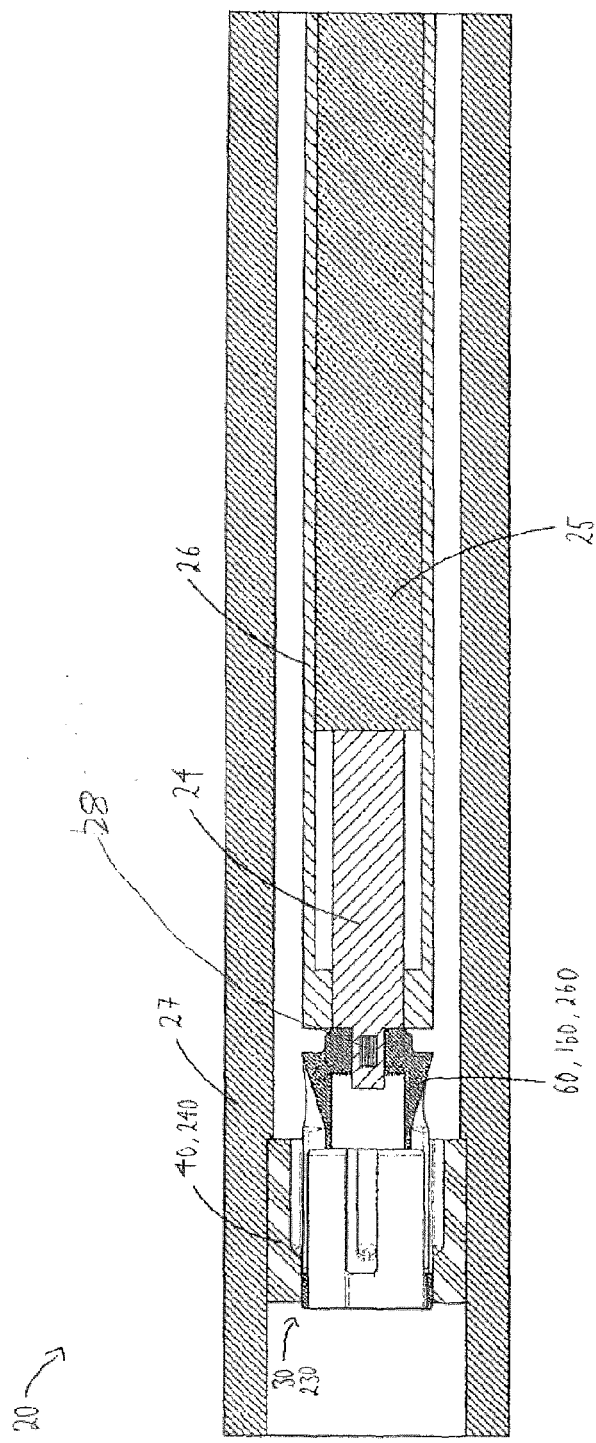
FIG. 2 is a schematic of a measurement while drilling (MWD) tool incorporating the fluid pressure pulse generator in accordance with embodiments of the invention.
Figure 3:
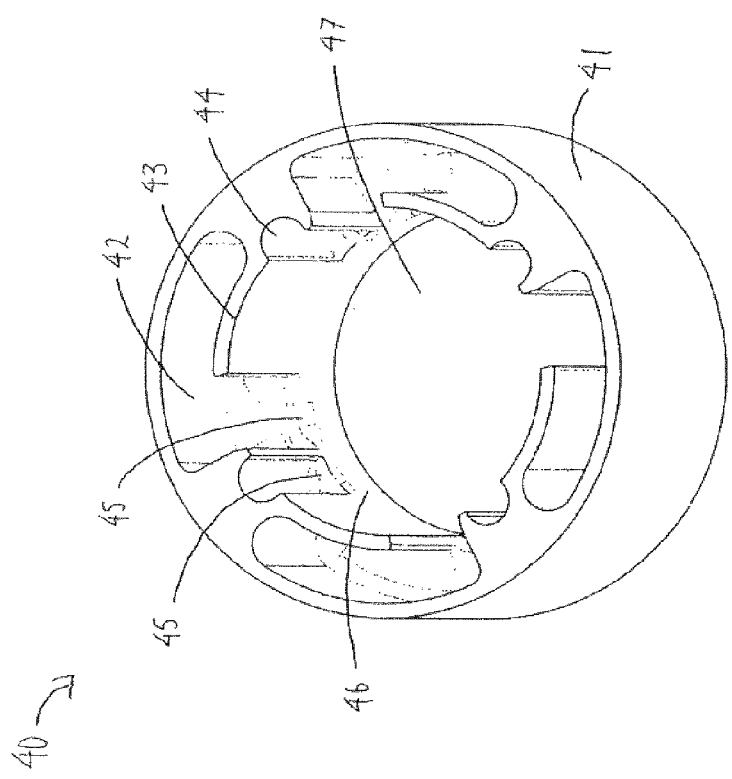
FIG. 3 is a perspective view of a stator of a fluid pressure pulse generator according to a first embodiment.
Figure 4:
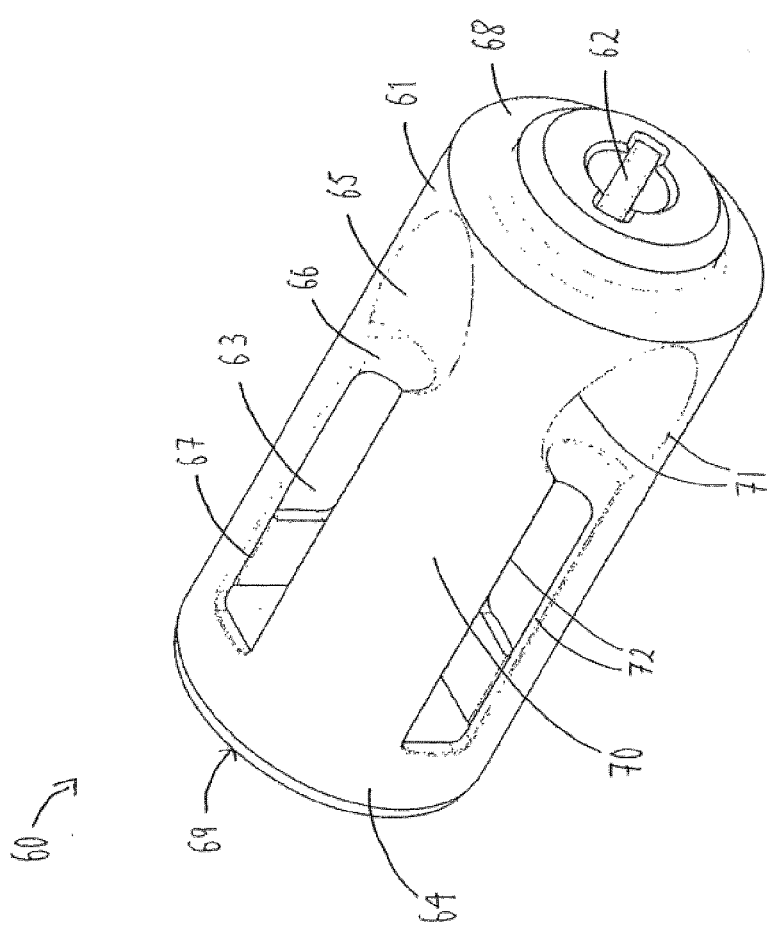
FIG. 4 is a perspective view of a first embodiment of a rotor of the fluid pressure pulse generator of the first embodiment.

Referring to FIG. 2, there is shown a MWD tool 20 incorporating the fluid pressure pulse generator 30, 230 comprising a stator 40, 240 and a rotor 60, 160, 260 in accordance with embodiments of the invention. The stator 40, 240 is fixed to a landing sub 27 and the rotor 60, 160, 260 is fixed to a drive shaft 24 of a pulser assembly 26 by a driveline coupling key 28. The pulser assembly 26 is fixed to and rotates with a drill collar (not shown). The pulser assembly 26 includes a sub assembly 25 which houses downhole sensors, control electronics, a motor, gearbox, mechanical stop subassembly and other equipment (not shown) required by the MWD tool to sense downhole information and rotate the drive shaft 24 and thereby rotate the rotor 60, 160, 260 in a controlled pattern to generate pressure pulses 5, 6. The fluid pressure pulse generator 30, 230 is located at the downhole end of the MWD tool 20. Drilling fluid pumped from the surface by pump 2 flows between the outer surface of the pulser assembly 26 and the inner surface of the landing sub 27. When the fluid reaches the fluid pressure pulse generator 30, 230 it is diverted through fluid openings 67, 167, 267a, 267b in the rotor 60, 160, 260 and exits the internal area of the rotor 60, 160, 260 as will be described in more detail below with reference to FIGS. 3 to 17. In different configurations of the rotor 60, 160, 260/stator 40, 240 combination, the fluid flow area varies, thereby creating positive pressure pulses 5, 6 that are transmitted to the surface as will be described in more detail below.

Fluid Pressure Pulse Generator

Figure 5:
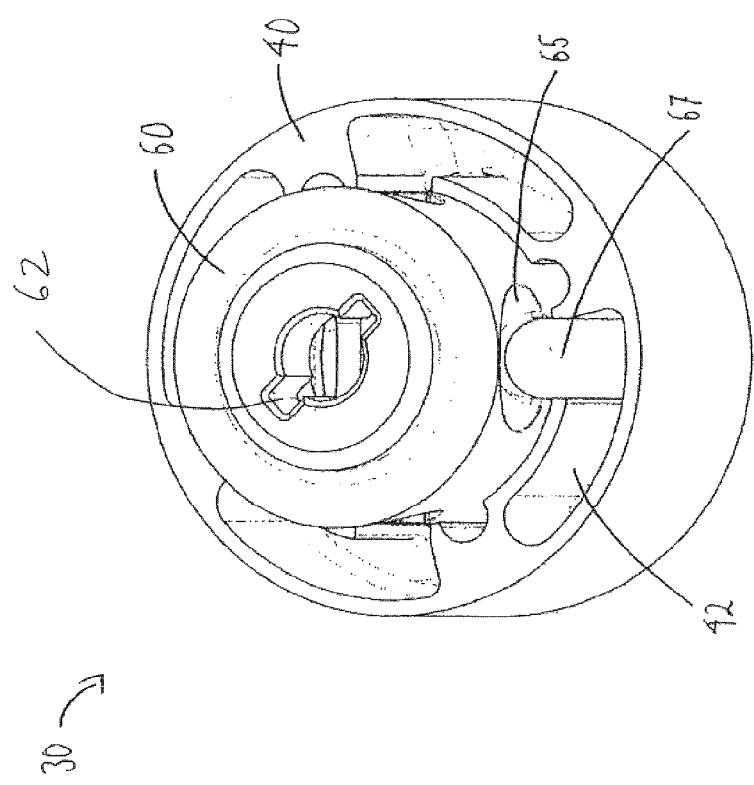
FIG. 5 is a perspective view of the rotor/stator combination of the fluid pressure pulse generator of the first embodiment in full flow configuration.
Figure 6:
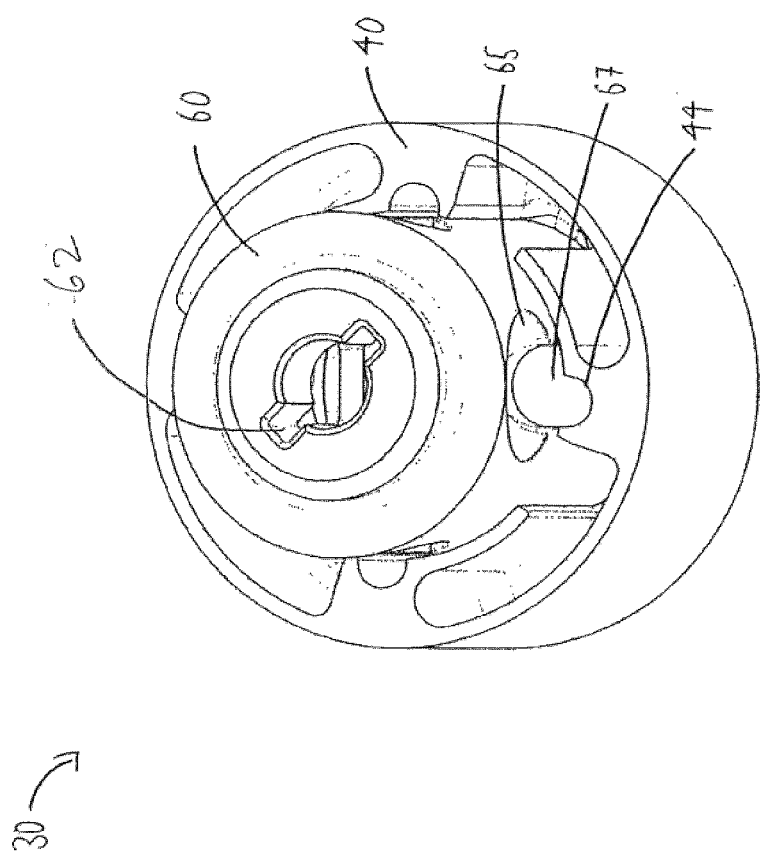
FIG. 6 is a perspective view of the rotor/stator combination of FIG. 5 in intermediate flow configuration.
Figure 7:
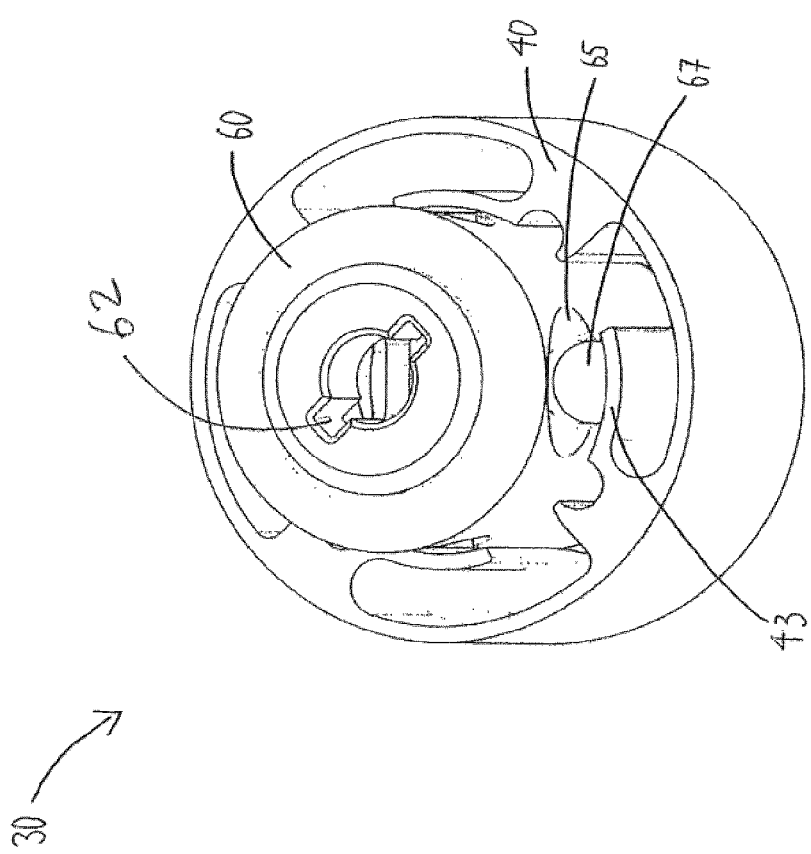
FIG. 7 is a perspective view of the rotor/stator combination of FIG. 5 in reduced flow configuration.

Referring now to FIGS. 3 to 7, there is shown the stator 40 and rotor 60 which combine to form the fluid pressure pulse generator 30 according to a first embodiment of the invention. The rotor 60 comprises a circular body 61 having an uphole end 68 with a drive shaft receptacle 62 and a downhole opening 69. The drive shaft receptacle 62 is configured to receive and fixedly connect with the drive shaft 24 of the pulser assembly 26, such that in use the rotor 60 is rotated by the drive shaft 24. The stator 40 comprises a stator body 41 with a circular opening 47 therethrough sized to receive the circular body 61 of the rotor as shown in FIGS. 5 to 7. The stator body 41 may be annular or ring shaped as shown in the embodiment of FIGS. 3 to 7, to enable it to fit within a drill collar of a downhole drill string, however in alternative embodiments (not shown) the stator body may be a different shape, for example square shaped, rectangular shaped, or oval shaped depending on the fluid pressure pulse operation it is being used for.

The stator 40 and rotor 60 are made up of minimal parts and their configuration beneficially provides easy line up and fitting of the rotor 60 within the stator 40. There is no positioning or height requirement and no need for an axial gap between the stator 40 and the rotor 60 as is required with known rotating disc valve pulsers. It is therefore not necessary for a skilled technician to be involved with set up of the fluid pressure pulse generator 30 and the operator can easily change or service the stator 40/rotor 60 combination if flow rate conditions change or there is damage to the rotor 60 or stator 40 during operation.

The circular body 61 of the rotor has four rectangular fluid openings 67 separated by four leg sections 70 and a mud lubricated journal bearing ring section 64 defining the downhole opening 69. The bearing ring section 64 helps centralize the rotor 60 in the stator 40 and provides structural strength to the leg sections 70. The circular body 61 also includes four depressions 65 that are shaped like the head of a spoon on an external surface of the circular body 61. Each spoon shaped depression 65 is connected to one of the fluid openings 67 by a flow channel 66 on the external surface of the body 61. Each connected spoon shaped depression 65, flow channel 66 and fluid opening 67 forms a fluid diverter and there are four fluid diverters positioned equidistance circumferentially around the circular body 61.

The spoon shaped depressions 65 and flow channels 66 direct fluid flowing in a downhole direction external to the circular body 61, through the fluid openings 67, into a hollow internal area 63 of the body, and out of the downhole opening 69. The spoon shaped depressions 65 gently slopes, with the depth of the depression increasing from the uphole end to the downhole end of the depression ensuring that the axial flow path or radial diversion of the fluid is gradual with no sharp turns. This is in contrast to the stator/rotor combination described in U.S. Pat. No. 8,251,160, where windows in the stator and the rotor align to create a fluid flow path orthogonal to the windows through the rotor and stator. The depth of the spoon shaped depressions 65 can vary depending on flow parameter requirements.

The spoon shaped depressions 65 act as a nozzle to aid fluid flow. Without being bound by science, it is thought that the nozzle design results in increased volume of fluid flowing through the fluid opening 67 compared to an equivalent fluid diverter without the nozzle design, such as the window fluid opening of the rotor/stator combination described in U.S. Pat. No. 8,251,160. Curved edges 71 of the spoon shaped depressions 65 also provide less resistance to fluid flow and reduction of pressure losses across the rotor/stator as a result of optimal fluid geometry. Furthermore, the curved edges 71 of the spoon shaped depressions 65 have a reduced surface compared to, for example, a channel having the same flow area as the spoon shaped depression 65. This means that the surface area of the curved edges 71 cutting through fluid when the rotor is rotated is minimized, thereby minimizing the force required to turn the rotor and reducing the motor torque requirement. By reducing the motor torque requirement, there is beneficially a reduction in battery consumption and less wear on the motor, beneficially minimizing costs.

Motor torque requirement is also reduced by minimizing the surface area of edges 72 of each leg section 70 which are perpendicular to the direction of rotation. Edges 72 cut through the fluid during rotation of the rotor 60 and therefore beneficially have as small a surface area as possible whilst still maintaining structural stability of the leg sections 70. To increase structural stability of the leg sections 70, the thickness at the middle of the leg section 70 furthest from the edges 72 may be greater than the thickness at the edges 72, although the wall thickness of each leg section 70 may be the same throughout. In addition, the bearing ring section 64 of the circular body 61 provides structural stability to the leg sections 70.

In alternative embodiments (not shown) a different curved shaped depression other than the spoon shaped depression may be utilized on the external surface of the rotor, for example, but not limited to, egg shaped, oval shaped, arc shaped, or circular shaped. Furthermore, the flow channel 66 need not be present and the fluid openings 67 may be any shape that allows flow of fluid from the external surface of the rotor through the fluid openings 67 to the hollow internal area 63.

The stator body 41 includes four full flow chambers 42, four intermediate flow chambers 44 and four walled sections 43 in alternating arrangement around the stator body 41. In the embodiment shown in FIGS. 3 to 7, the four full flow chambers 42 are L shaped and the four intermediate flow chambers 44 are U shaped, however in alternative embodiments (not shown) other configurations may be used for the chambers 42, 44. The geometry of the chambers is not critical provided the flow area of the chambers is conducive to generating the intermediate pulse 5 and no pulse in different flow configurations as described below in more detail. A solid bearing ring section 46 at the downhole end of the stator body 41 helps centralize the rotor in the stator and minimizes flow of fluid between the external surface of the rotor 60 and the internal surface of the stator 40. Four flow sections are positioned equidistance around the circumference of the stator 40, with each flow section having one of the intermediate flow chambers 44, one of the full flow chambers 42, and one of the wall sections 43. The full flow chamber 42 of each flow section is positioned between the intermediate flow chamber 44 and the walled section 43.

In use, each of the four flow sections of the stator 40 interact with one of the four fluid diverters of the rotor 60. The rotor 60 is rotated in the fixed stator 40 to provide three different flow configurations as follows:

1. Full flow—where the rotor fluid openings 67 align with the stator full flow chambers 42, as shown in FIG. 5;
2. Intermediate flow—where the rotor fluid openings 67 align with the stator intermediate flow chambers 44, as shown in FIG. 6; and
3. Reduced flow—where the rotor fluid openings 67 align with the stator walled sections 43, as shown in FIG. 7.

In the full flow configuration shown in FIG. 5, the stator full flow chambers 42 align with the fluid openings 67 and flow channels 66 of the rotor, so that fluid flows from the full flow chambers 42 through the fluid openings 67. The flow area of the full flow chambers 42 may correspond to the flow area of the rotor fluid openings 67. This corresponding sizing beneficially leads to no or minimal resistance in flow of fluid through the fluid openings 67 when the rotor is positioned in the full flow configuration. There is zero pressure increase and no pressure pulse is generated in the full flow configuration. The L shaped configuration of the chambers 42 minimizes space requirement as each L shaped chamber tucks behind one of the walled sections 43 allowing for a compact stator design, which beneficially reduces production costs and results in less likelihood of blockage.

When the rotor is positioned in the reduced flow configuration as shown in FIG. 7, there is no flow area in the stator as the walled section 43 aligns with the fluid openings 67 and flow channels 66 of the rotor. Fluid is still diverted by the spoon shaped depressions 65 along the flow channels 66 and through the fluid openings 67, however, the total overall flow area is reduced compared to the total overall flow area in the full flow configuration. The fluid pressure therefore increases to generate the full pressure pulse 6.

In the intermediate flow configuration as shown in FIG. 6, the intermediate flow chambers 44 align with the fluid openings 67 and flow channels 66 of the rotor, so that fluid flows from the intermediate flow chambers 44 through the fluid openings 67. The flow area of the intermediate flow chambers 44 is less than the flow area of the full flow chambers 42, therefore, the total overall flow area in the intermediate flow configuration is less than the total overall flow area in the full flow configuration, but more than the total overall flow area in the reduced flow configuration. As a result, the flow of fluid through the fluid openings 67 in the intermediate flow configuration is less than the flow of fluid through the fluid openings 67 in the full flow configuration, but more than the flow of fluid through the fluid openings 67 in the reduced flow configuration. The intermediate pressure pulse 5 is therefore generated which is reduced compared to the full pressure pulse 6. The flow area of the intermediate flow chambers 44 may be one half, one third, one quarter the flow area of the full flow chambers 42, or any amount that is less than the flow area of the full flow chambers 42 to generate the intermediate pressure pulse 5 and allow for differentiation between pressure pulse 5 and pressure pulse 6.

When the rotor 60 is positioned in the reduced flow configuration as shown in FIG. 7, fluid is still diverted by the spoon shaped depressions 65 along the flow channels 66 and through the fluid openings 67 otherwise the pressure build up would be detrimental to operation of the downhole drilling. In contrast to the rotor/stator combination disclosed in U.S. Pat. No. 8,251,160, where the constant flow of fluid is through a plurality of circular holes in the stator, in the present embodiment, the constant flow of fluid is through the rotor fluid openings 67. This beneficially reduces the likelihood of blockages and also allows for a more compact stator design as there is no need to have additional fluid openings in the stator.

A bottom face surface 45 of both the full flow chambers 42 and the intermediate flow chambers 44 of the stator 40 may be angled in the downhole flow direction for smooth flow of fluid from chambers 42, 44 through the rotor fluid openings 67 in the full flow and intermediate flow configurations respectively, thereby reducing flow turbulence. In all three flow configurations the full flow chambers 42 and the intermediate flow chambers 44 are filled with fluid, however fluid flow from the chambers 42, 44 will be restricted unless the rotor fluid openings 67 are aligned with the full flow chambers 42 or intermediate flow chambers 44 in the full flow and intermediate flow configurations respectively.

A combination of the spoon shaped depressions 65 and flow channels 66 of the rotor 60 and the angled bottom face surface 45 of the chambers 42, 44 of the stator provide a smooth fluid flow path with no sharp angles or bends. The smooth fluid flow path beneficially minimizing abrasion and wear on the pulser assembly 26.

Provision of the intermediate flow configuration allows the operator to choose whether to use the reduced flow configuration, intermediate flow configuration or both configurations to generate pressure pulses depending on fluid flow conditions. The fluid pressure pulse generator 30 can operate in a number of different flow conditions. For higher fluid flow rate conditions, for example, but not limited to, deep downhole drilling or when the drilling mud is heavy or viscous, the pressure generated using the reduced flow configuration may be too great and cause damage to the system. The operator may therefore choose to only use the intermediate flow configuration to produce detectable pressure pulses at the surface. For lower fluid flow rate conditions, for example, but not limited to, shallow downhole drilling or when the drilling mud is less viscous, the pressure pulse generated in the intermediate flow configuration may be too low to be detectable at the surface. The operator may therefore choose to operate using only the reduced flow configuration to produce detectable pressure pulses at the surface. Thus it is possible for the downhole drilling operation to continue when the fluid flow conditions change without having to change the fluid pressure pulse generator 30. For normal fluid flow conditions, the operator may choose to use both the reduced flow configuration and the intermediate flow configuration to produce two distinguishable pressure pulses 5, 6, at the surface and increase the data rate of the fluid pressure pulse generator 30.

If one of the stator chambers (either full flow chambers 42 or intermediate flow chambers 44) is blocked or damaged, or one of the stator wall sections 43 is damaged, operations can continue, albeit at reduced efficiency, until a convenient time for maintenance. For example, if one or more of the stator wall sections 43 is damaged, the full pressure pulse 6 will be affected; however operation may continue using the intermediate flow configuration to generate intermediate pressure pulse 5. Alternatively, if one or more of the intermediate flow chambers 44 is damaged or blocked, the intermediate pulse 5 will be affected; however operation may continue using the reduced flow configuration to generate the full pressure pulse 6. If one or more of the full flow chambers 42 is damaged or blocked, operation may continue by rotating the rotor between the reduced flow configuration and the intermediate flow configuration. Although there will be no zero pressure state, there will still be a pressure differential between the full pressure pulse 6 and the intermediate pressure pulse 5 which can be detected and decoded on the surface until the stator can be serviced. Furthermore, if one or more of the rotor fluid openings 67 are damaged or blocked which results in one of the flow configurations not being usable, the other two flow configurations can be used to produce a detectable pressure differential. For example, damage to one of the rotor fluid openings 67 may result in an increase in fluid flow through the rotor such that the intermediate flow configuration and the full flow configuration do not produce a detectable pressure differential, and the reduced flow configuration will need to be used to get a detectable pressure pulse.

Provision of multiple rotor fluid openings 67 and multiple stator chambers 42, 44 and wall sections 43, provides redundancy and allows the fluid pressure pulse generator 30 to continue working when there is damage or blockage to one of the rotor fluid openings 67 and/or one of the stator chambers 42, 44 or wall sections 43. Cumulative flow of fluid through the remaining undamaged or unblocked rotor fluid openings 67 and stator chambers 42, 44 still results in generation of detectable full or intermediate pressure pulses 5, 6, even though the pulse heights may not be the same as when there is no damage or blockage.

It is evident from the foregoing that while the embodiments shown in FIGS. 3 to 7 utilize four fluid openings 67 together with four full flow chambers 42, four intermediate flow chambers 44 and four wall sections 43 in the stator, different numbers of rotor fluid openings 67, stator flow chambers 42, 44 and stator wall sections 43 may be used. Provision of more fluid openings 67, chambers 42, 44 and wall section 43 beneficially reduces the amount of rotor rotation required to move between the different flow configurations, however, too many openings 67, chambers 42, 44 and wall section 43 decreases the stability of the rotor and/or stator and may result in a less compact design thereby increasing production costs. Furthermore, the number of rotor fluid openings 67 need not match the number of stator flow chambers 42, 44 and stator wall sections 43. Different combinations may be utilized according to specific operation requirements of the fluid pressure pulse generator. In alternative embodiments (not shown) the intermediate flow chambers 44 need not be present or there may be additional intermediate flow chambers present that have a flow area less than the flow area of full flow chambers 42. The flow area of the additional intermediate flow chambers may vary to produce additional intermediate pressure pulses and increase the data rate of the fluid pressure pulse generator 30. The innovative aspects of the invention apply equally in embodiments such as these.

It is also evident from the foregoing that while the embodiments shown in FIGS. 3 to 7 utilize fluid openings in the rotor and flow chambers in the stator, in alternative embodiments (not shown) the fluid openings may be positioned in the stator and the flow chambers may be present in the rotor. In these alternative embodiments the rotor still rotates between full flow, intermediate flow and reduced flow configurations whereby the fluid openings in the stator align with full flow chambers, intermediate flow chambers and wall sections of the rotor respectively. The innovative aspects of the invention apply equally in embodiments such as these.

Low Flow Rotor

Figure 8:
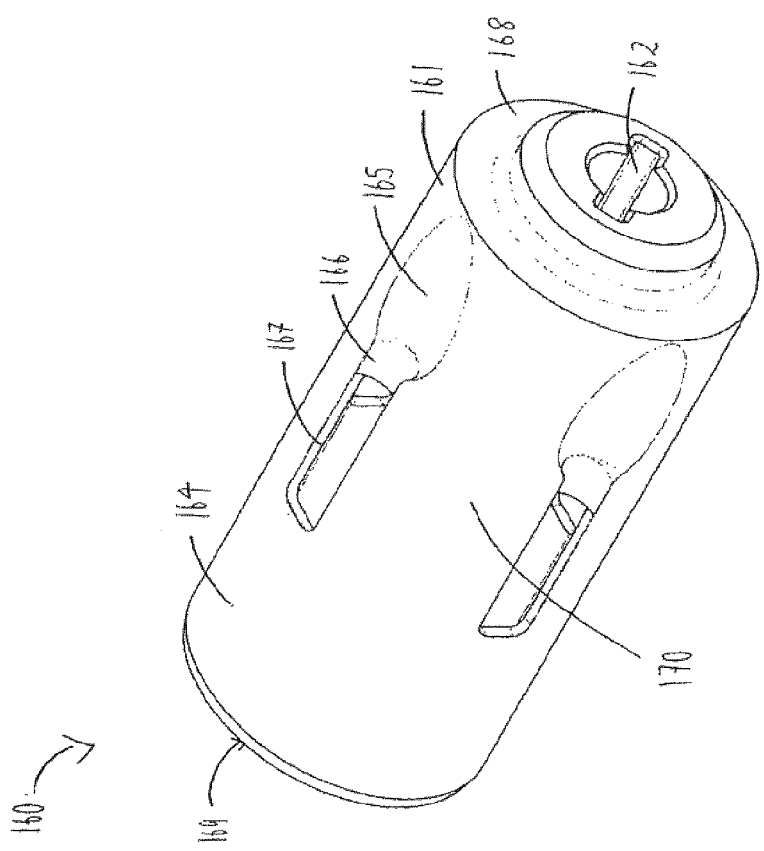
FIG. 8 is a perspective view of a second embodiment of the rotor of the fluid pressure pulse generator of the first embodiment.
Figure 9:
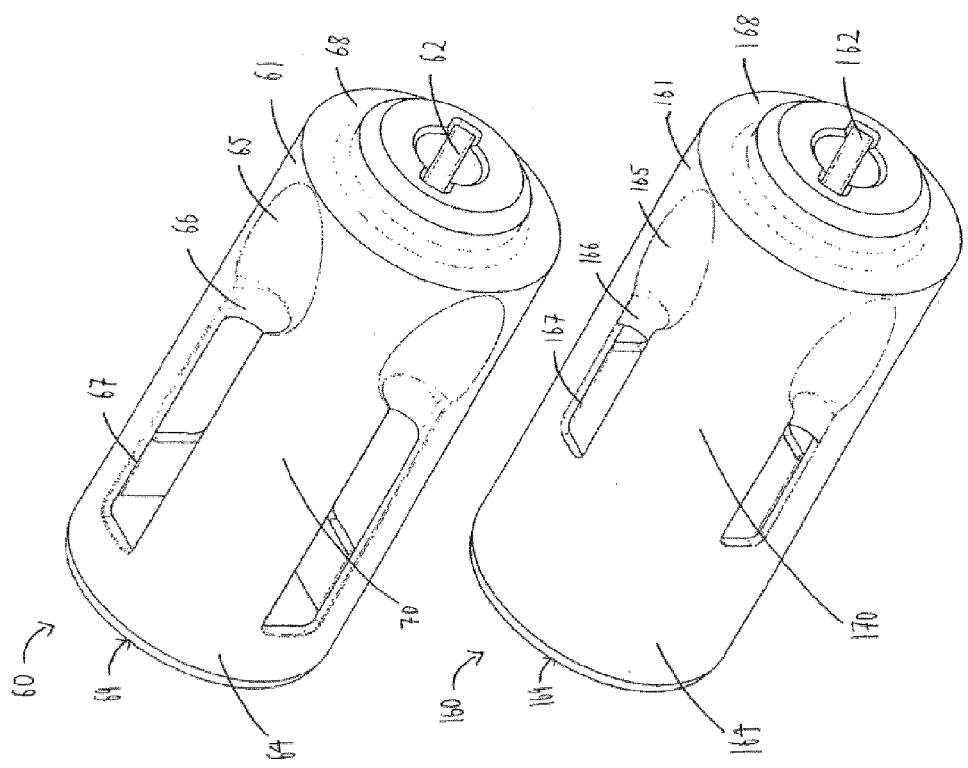
FIG. 9 is a perspective view of the first and second embodiments of the rotor of the fluid pressure pulse generator of the first embodiment.
Figure 10:
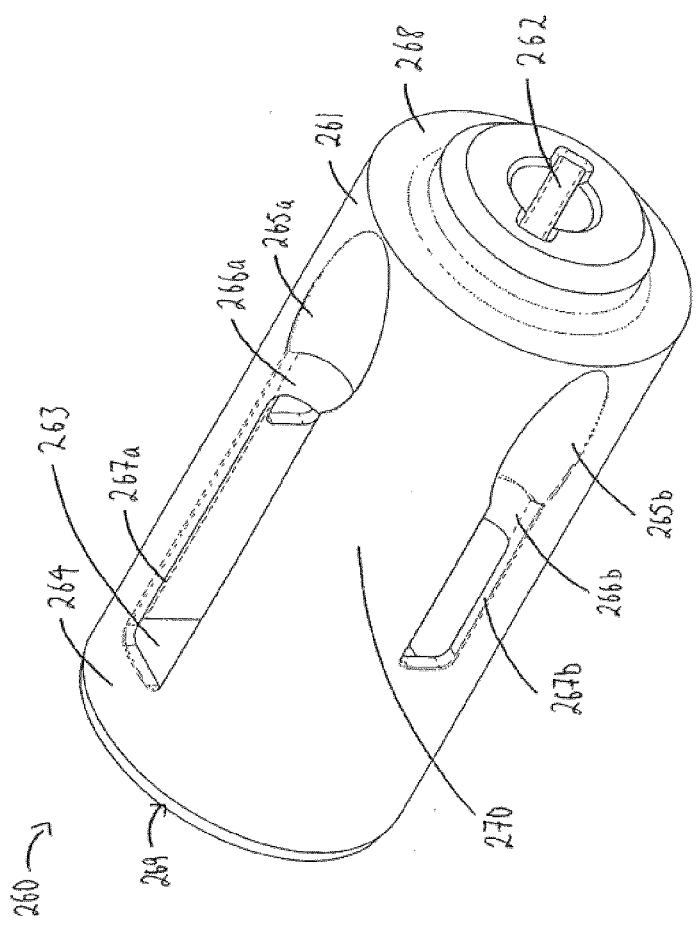
FIG. 10 is a perspective view of a rotor of a fluid pressure pulse generator according to a second embodiment.
Figure 11:
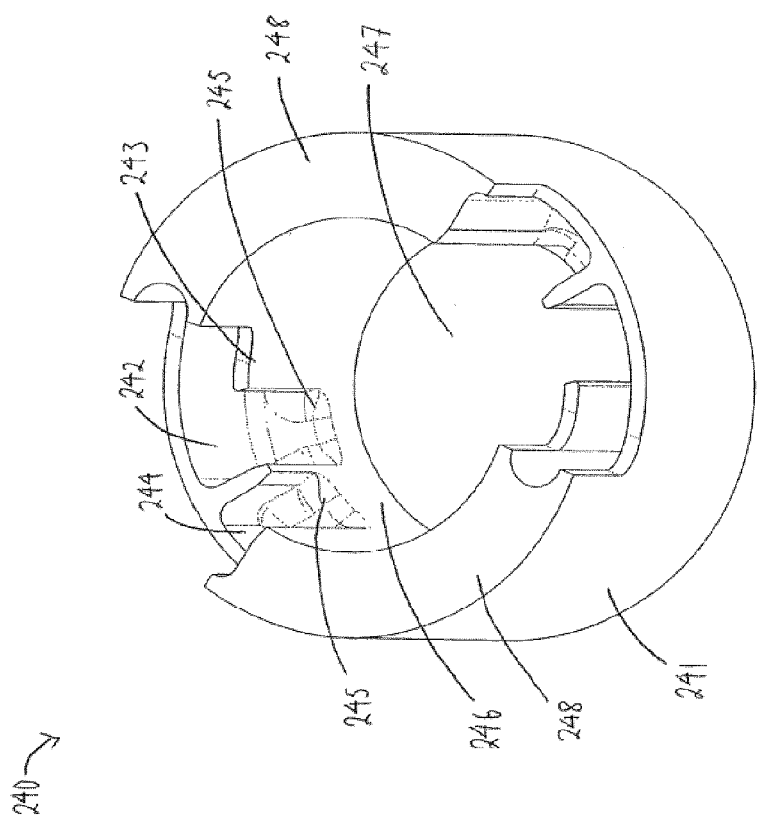
FIG. 11 is a perspective view of a stator of the fluid pressure pulse generator of the second embodiment.

Referring now to FIGS. 8 and 9, and according to a further embodiment, there is shown a low flow rotor 160 for use in low fluid flow rate conditions, such as in a shallow wellbore or when the drilling fluid is less viscous. As with rotor 60, the low flow rotor 160 comprises a circular body 161 having an uphole end 168 with a drive shaft receptacle 162 and a downhole opening 169. The circular body 161 has four fluid openings 167, four leg sections 170 and a mud lubricated journal bearing ring section 164 similar to the fluid openings 67, leg sections 70 and bearing ring section 64 of rotor 60, however, the fluid openings 167 are shorter and narrower, the leg sections 170 are shorter and wider, and the bearing ring section 164 is wider than the corresponding parts in rotor 60. The circular body 161 also includes four depressions 165 shaped like the head of a spoon and four flow channel 166 on the external surface of the circular body 161 which are similar to the spoon shaped depressions 65 and flow channels 66 of rotor 60, however, the spoon shaped depressions 165 and flow channels 166 are narrower and shallower than the corresponding parts in rotor 60.

The low flow rotor 160 can be easily slotted into stator 40 to replace rotor 60 when low flow rate conditions are predicated, by removing coupling key 28 to de-couple the rotor 60 from the drive shaft 24. The fluid openings 167 of the low flow rotor 160 have a smaller flow area than the fluid openings 67 of rotor 60 and the total combined flow area of the low flow rotor 160 and stator 40 in each of the three different flow configurations is less than the total combined flow area of the rotor 60 and stator 40. Pressure pulses 5, 6 can therefore be detected at the surface in the reduced or intermediate flow configurations using the low flow rotor 160 in lower fluid flow rate conditions than when using rotor 60.

In alternative embodiments (not shown) the fluid openings 167 of low flow rotor 160 may be of a different shape and configuration provided the flow area of the fluid openings 167 is less than the flow area of fluid openings 67 of rotor 60. The spoon shaped depressions 165 and flow channels 166 of the low flow rotor 160 may be the same or different configuration compared to the spoon shaped depressions 65 and flow channels 66 of rotor 60.

In order to accommodate different fluid flow conditions using rotary valve pulsers that are currently used in downhole drilling, a skilled operator must be brought in to adjust the pulse height gap between the stator and the rotor and specialized tools are required. The low flow rotor 160 and rotor 60 of the present embodiments can be easily interchanged depending on the fluid flow operating conditions, without requiring a skilled operator or specialized tools. The delay on the rig is minimal during set up of the appropriate rotor/stator configuration, thereby saving time and reducing costs. If the low flow rotor 160 is fitted and the flow rate is higher than anticipated such that the reduced flow configuration is not usable because it will generate too much pressure, the low flow rotor 160 can still operate between the full flow configuration and the intermediate flow configuration to generate the intermediate pressure pulse 5 that can be detected at the surface. Similarly, if the flow rate is lower than anticipated and too low to generate a detectable pressure pulse using the intermediate flow configuration, then the low flow rotor 160 can still operate between the full flow configuration and the reduced flow configuration to generate the full pressure pulse 6 that can be detected at the surface.

It is evident from the foregoing that while the embodiments of the low flow rotor 160 shown in FIGS. 8 and 9 utilize four fluid openings 167 a different numbers of rotor fluid openings 167 may be used. For example, in very low flow rate conditions, a rotor with only two truncated fluid openings 167 may be provided to ensure that a pressure pulse is detectable at the surface. Furthermore, the number of rotor fluid openings 167 need not match the number of flow chambers 42, 44 and wall sections 43 in the stator 40. Different combinations may be utilized according to specific operation requirements of the fluid pressure pulse generator. The innovative aspects of the invention apply equally in embodiments such as these.

Dual Flow Fluid Pressure Pulse Generator

Referring now to FIGS. 10 to 17, there is shown a dual flow stator 240 and dual flow rotor 260 which combine to form a dual flow fluid pressure pulse generator 230 according to a second embodiment of the invention. The dual flow rotor 260 comprises a circular body 261 having an uphole surface 268 with a drive shaft receptacle 262 and a downhole opening 269. The drive shaft receptacle 262 is configured to receive and fixedly connect with the drive shaft 24 of the pulser assembly 26, such that in use the dual flow rotor 260 is rotated by the drive shaft 24. The dual flow stator 240 comprises a stator body 241 with a circular opening 247 therethrough sized to receive the circular body 261 of the rotor as shown in FIGS. 12 to 17.

The circular body 261 of the rotor has two opposed high flow fluid openings 267a and two opposed low flow fluid openings 267b separated by four leg sections 270. The high flow fluid openings 267a are wider and longer than the low flow fluid openings 267b, thereby providing a larger flow area therethrough than the flow area of the low flow fluid openings 267b. A mud lubricated journal bearing ring section 264 joins all four leg sections 270 and defines the downhole opening 269. The external surface of the circular body 261 has two opposed high flow depressions 265a shaped like the head of a spoon and two opposed low flow depressions 265b shaped like the head of a spoon. Each high flow spoon shaped depression 265a is connected to one of the high flow fluid openings 267a by a high flow channel 266a on the external surface of the body 261. Each low flow spoon shaped depression 265b is connected to one of the low flow fluid openings 267b by a low flow channel 266b on the external surface of the body 261. The low flow spoon shaped depressions 265b and low flow channels 266b are narrower and shallower than the high flow spoon shaped depressions 265a and high flow channels 266a.

The spoon shaped depressions 265a, 265b and flow channels 266a, 266b direct fluid flowing in a downhole direction external to the circular body 261, through the fluid openings 267a, 267b, into a hollow internal area 263 of the body, and out of the downhole opening 269. In alternative embodiments (not shown) a different curved shaped depression other than the spoon shaped depression may be used on the external surface of the rotor 260, for example but not limited to, egg shaped, oval shaped, arc shaped, or circular shaped. Furthermore, the flow channel 266a, 266b need not be present and the fluid openings 267a, 267b may be any shaped opening that allows flow of fluid from the external surface of the rotor 260 through the fluid openings 267a, 267b to the hollow internal area 263.

The stator body 241 includes two opposed full flow chambers 242, two opposed intermediate flow chambers 244 and two opposed walled sections 243. The bottom face surface 245 of both the full flow chambers 242 and the intermediate flow chambers 244 may be angled in the downhole flow direction for smooth flow of fluid through the rotor fluid openings 267a, 267b during operation. In the embodiment shown in FIGS. 11 to 17, the full flow chambers 242 are L shaped and the intermediate flow chambers 244 are U shaped, however in alternative embodiments (not shown) other configurations may be used for the chambers 242, 244. The geometry of the chambers is not critical provided the flow area of the chambers is conducive to generating the intermediate pulse 5 and no pulse in different flow configurations as described below in more detail. The L shaped configuration of the chambers 242 minimizes space requirement for the stator 240 as each L shaped chamber 242 tucks behind one of the walled sections 243 allowing for a compact stator design, which beneficially reduces production costs and results in less likelihood of blockage.

There are two flow sections positioned on opposed sides of the stator 240, with each flow section having one of the intermediate flow chambers 244, one of the full flow chambers 242, and one of the wall sections 243; with the full flow chamber 242 positioned between the intermediate flow chamber 244 and the walled section 243. A solid bearing ring section 246 at the downhole end of the stator body 241 helps centralize the rotor in the stator and minimize flow of fluid between the external surface of the rotor 260 and the internal surface of the stator 240.

In use, the dual flow fluid pressure pulse generator 230 can operate in either a high flow or a low flow mode depending on the fluid flow conditions downhole. For example, the high flow mode may be used for deep downhole drilling with high fluid flow rates or when the drilling mud is heavy or viscous, and the low flow mode may be used for shallower downhole drilling with low fluid flow rates or when the drilling mud is less viscous. In the high flow mode, the high flow fluid openings 267a of the rotor 260 line up with the two opposed flow sections of the stator 240, to allow flow of fluids through the high flow fluid openings 267a. In the low flow mode the low flow fluid openings 267b of the rotor 260 line up with the two opposed flow sections of the stator 240, to allow flow of fluids through the low flow fluid openings 267b. As the flow area of the high flow fluid openings 267a is larger than the flow area of the low flow fluid openings 267b, the high flow mode allows for higher fluid flow rates or more viscous drilling fluid without excessive pressure build-up than in the low flow mode, whereas the low mode can be used with low fluid flow rates or less viscous drilling mud and still pick up a detectable pressure signal at the surface.

The stator 240 includes a deactivation zone comprising two opposed curved walls 248 with the top of the curved walls 248 substantially in line with the uphole surface 268 of the rotor when the rotor and stator are fitted together as shown in FIGS. 12 to 17. In the high flow mode, the curved walls 248 cover the low flow spoon shaped depressions 265b, low flow channels 266b and low flow openings 267b to block flow of fluids through the low flow fluid openings 267b. In the low flow mode, the curved walls 248 cover the high flow spoon shaped depressions 265a, high flow channels 266a and high flow openings 267a to block flow of fluids through the high flow fluid openings 267a.

Figure 12:
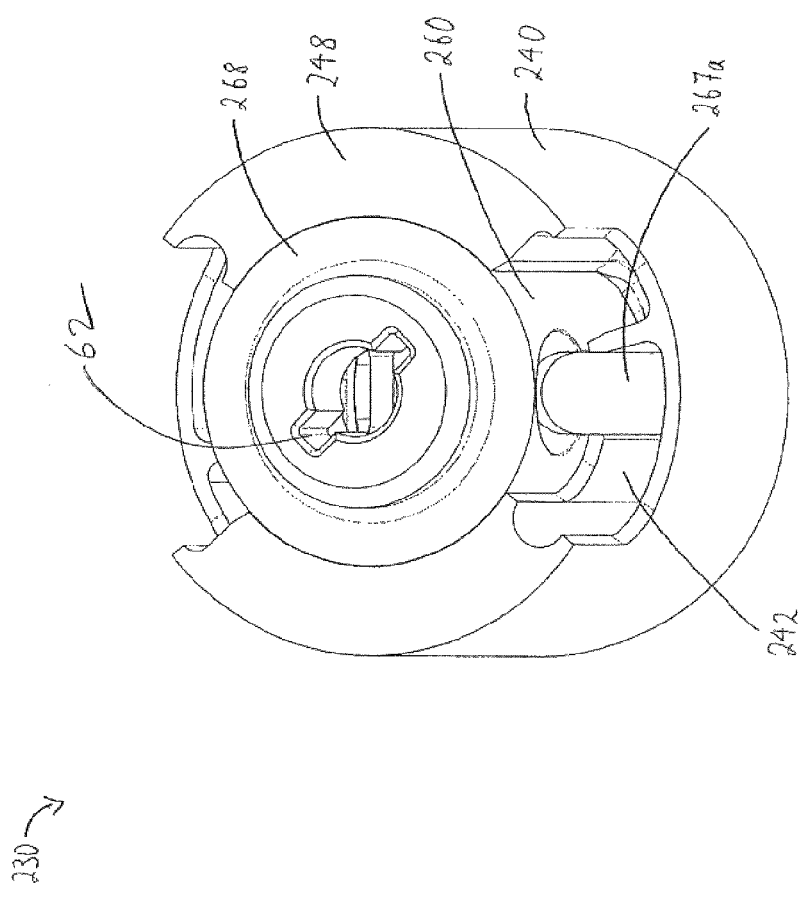
FIG. 12 is a perspective view of the rotor/stator combination of the fluid pressure pulse generator of the second embodiment in high flow mode full flow configuration.
Figure 13:
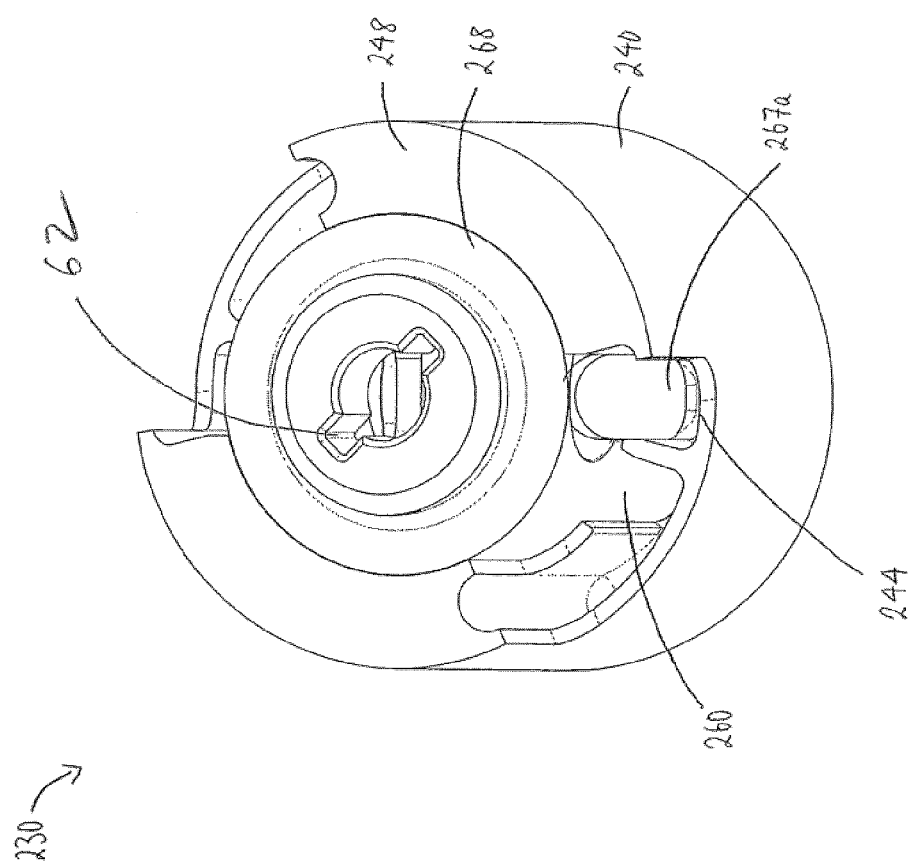
FIG. 13 is a perspective view of the rotor/stator combination of FIG. 12 in high flow mode intermediate flow configuration.
Figure 14:
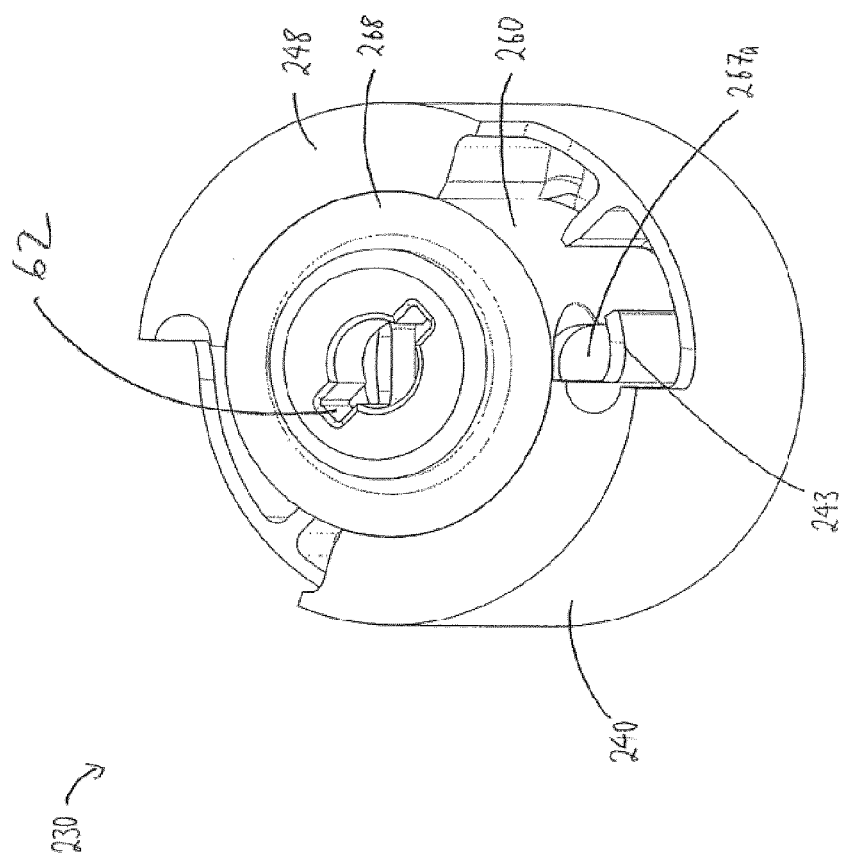
FIG. 14 is a perspective view of the rotor/stator combination of FIG. 12 in a high flow mode reduced flow configuration.
Figure 15:
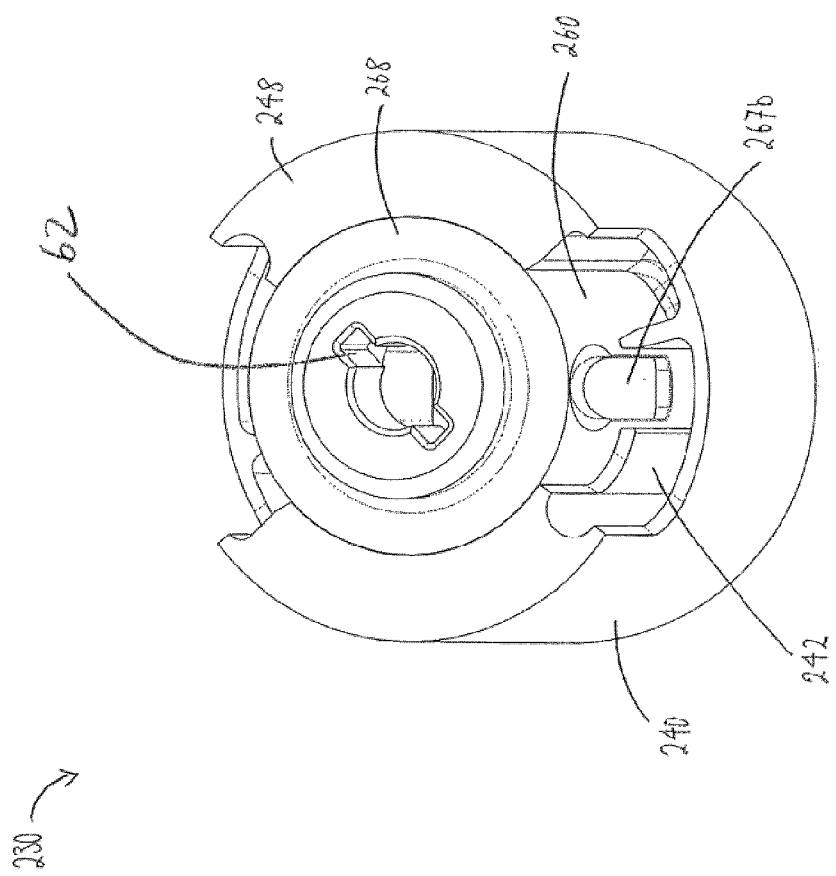
FIG. 15 is a perspective view of the rotor/stator combination of FIG. 12 in low flow mode full flow configuration.
Figure 16:
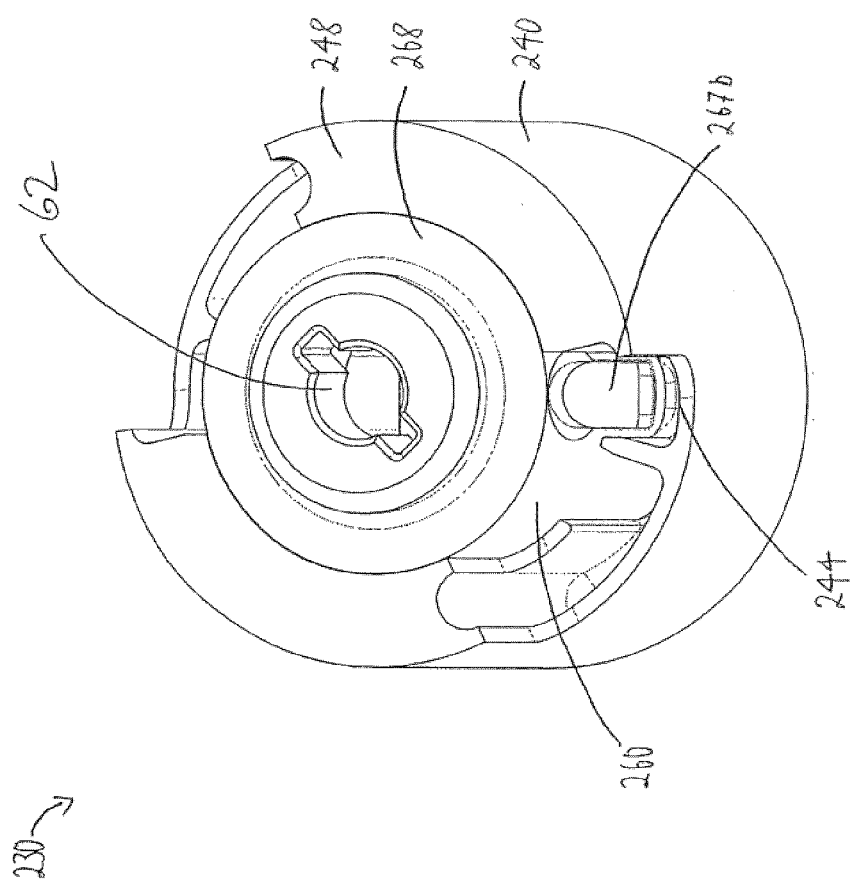
FIG. 16 is a perspective view of the rotor/stator combination of FIG. 12 in low flow mode intermediate flow configuration.
Figure 17:
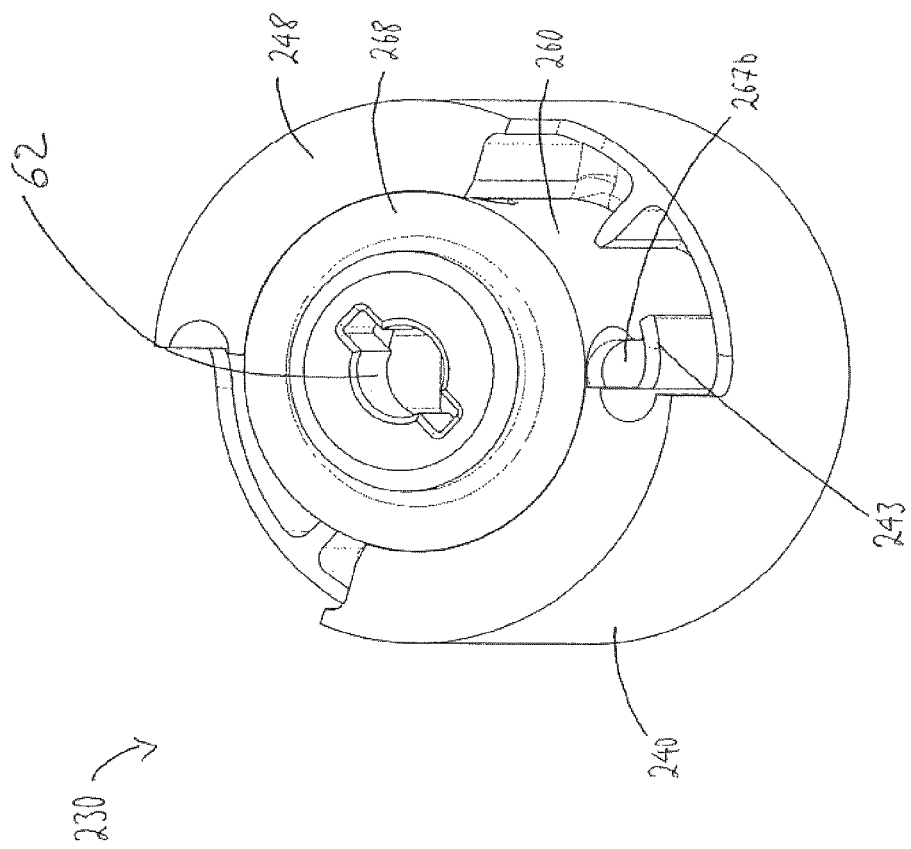
FIG. 17 is a perspective view of the rotor/stator combination of FIG. 12 in a low flow mode reduced flow configuration.
Figure 18:
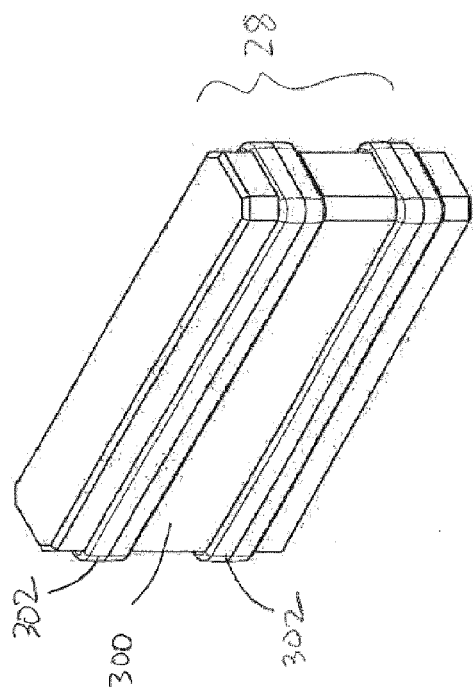
FIG. 18 is a perspective view of a coupling key for coupling a drive shaft of a pulser assembly to any of the embodiments of the fluid pressure pulse generator.
Figure 19:
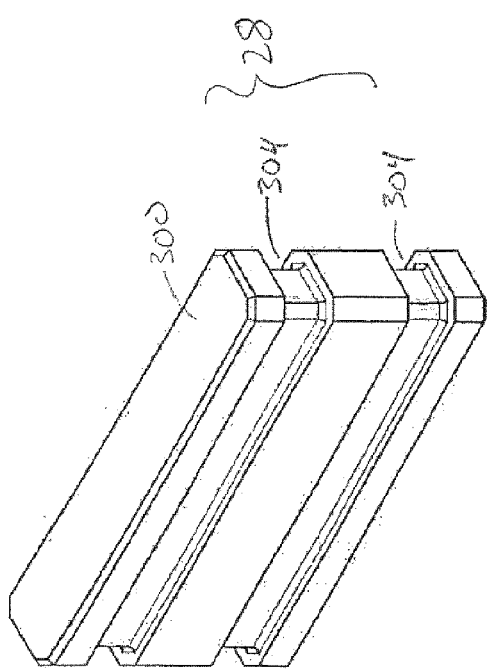
FIG. 19 is a perspective view of a key body of the coupling key.

In use, the dual flow rotor 260 rotates between six different flow configurations as follows:

1. High flow mode full flow—where the rotor high flow fluid openings 267a align with the stator full flow chambers 242, as shown in FIG. 12;
2. High flow mode intermediate flow—where the rotor high flow fluid openings 267a align with the stator intermediate flow chambers 244, as shown in FIG. 13;
3. High flow mode reduced flow—where the rotor high flow fluid openings 267a align with the stator walled sections 243, as shown in FIG. 14;
4. Low flow mode full flow—where the rotor low flow fluid openings 267b align with the stator full flow chambers 242, as shown in FIG. 15;
5. Low flow mode intermediate flow—where the rotor low flow fluid openings 267b align with the stator intermediate flow chambers 244, as shown in FIG. 16; and
6. Low flow mode reduced flow—where the rotor low flow fluid openings 267b align with the stator walled sections 243, as shown in FIG. 17.

In operation, the dual flow fluid pressure pulse generator 230 can generate the full pressure pulse 6 and intermediate pressure pulse 5 for both the high flow mode and low flow mode and the operator can easily rotate between any of the six different flow configurations described above depending on fluid flow conditions downhole. There is no need for the operator to halt operations and change the fluid pressure pulse generator when different fluid flow conditions are detected, thereby beneficially reducing time delays and reducing costs.

It is evident from the foregoing that while the embodiments shown in FIGS. 10 to 17 utilize two high flow fluid openings 267a and two low flow fluid openings 267b in the dual flow rotor 240 a different number of fluid openings may be present. Furthermore, a different number of stator flow sections may be present instead of the two opposed flow sections shown in FIGS. 10 to 17. Different combinations may be utilized according to specific operation requirements of the dual flow fluid pressure pulse generator 230. In alternative embodiments (not shown) the stator intermediate flow chambers 244 need not be present or there may be additional intermediate flow chambers present that have a flow area less than the flow area of the full flow chambers 242. The flow area of the additional intermediate flow chambers may vary to produce additional intermediate pressure pulses and increase the data rate of the dual flow fluid pressure pulse generator 230. The innovative aspects of the invention apply equally in embodiments such as these.

While the embodiments shown in FIGS. 10 to 17 utilize fluid openings in the dual flow rotor 260 and flow chambers in the dual flow stator 240, in alternative embodiments (not shown) the high flow and low flow fluid openings may be positioned in the dual flow stator and the flow sections and deactivation zone may be present in the dual flow rotor. In these alternative embodiments the rotor still operates in the high flow mode and low flow mode and rotates between the six different flow configurations whereby the high flow fluid openings or the low flow fluid openings in the stator align with full flow chambers, intermediate flow chambers and wall sections of the rotor. The innovative aspects of the invention apply equally in embodiments such as these.

One Size Fits all MWD Tool

In the embodiments disclosed herein, it is possible to utilized a one sized rotor 60, 160, 260 with various different sized stators 40, 240 to fit a variety of different downhole drilling operations. The stator size may vary depending on the drill collar dimensions and is typically sized to be snugly received within the drill collar. This allows the rotor, 60, 160, 260 to be connected to the drive shaft 24 of the MWD tool 20, with only the stator 40, 240 being sized depending on the dimensions of the drill string. It is therefore possible to service a range of different downhole drilling operations with a one size fits all MWD tool 20 including the rotor 60, 160, 260, in combination with a variety of different sized stators 40, 240.

Staged Oscillation Method

In use, the rotor 60, 160, 260 of the fluid pressure pulse generator embodiments described herein oscillates back and forth between the full flow, intermediate flow and reduced flow configurations in a staged oscillation method to generate a pattern of pressure pulses. In the staged oscillation method the rotor 60, 160, 260 starts in the full flow configuration with the rotor fluid openings 67, 167, 267a, 267b aligned with the stator full flow chambers 42, 242 so there is zero pressure. The rotor 60, 160, 260 then rotates to either one of two different positions depending on the pressure pulse pattern required as follows:

Position 1—rotation 30 degrees in an anticlockwise direction to the intermediate flow configuration where the rotor fluid openings 67, 167, 267a, 267b align with the stator intermediate flow chambers 44, 244 to generate the intermediate pressure pulse 5; or Position 2—30 degrees in a clockwise direction to the reduced flow configuration where the rotor fluid openings 67, 167, 267a, 267b align with the stator walled sections 43, 243 to generate the full pressure pulse 6.

After generation of each of the pressure pulses 5, 6, the rotor returns to the start position (i.e. full flow configuration with zero pressure) before generating the next pressure pulse. For example, the rotor can rotate in the following pattern:

start position-position-1-start position-position 1-start position-position 2-start position This will generate:

intermediate pressure pulse 5-intermediate pressure pulse 5-full pressure pulse 6.

Return of the rotor 60, 160, 260 to the start position between generation of each pressure pulse, allows for a constant re-check of timing and position for signal processing and precise control. The start position at zero pressure provides a clear indication of the end of a previous pulse and start of a new pulse. Also if the rotor 60, 160, 260 is knocked during operation or otherwise moves out of position, the rotor 60, 160, 260 returns to the start position to recalibrate and start over. This beneficially minimizes the potential for error over the long term performance of the fluid pressure pulse generator 30, 230.

A precise pattern of pressure pulses can therefore be generated through rotation of the rotor 30 degrees in a clockwise direction and 30 degrees in an anticlockwise direction. As the rotor 60, 160, 260 is rotated in both clockwise and anticlockwise directions, there is less chance of wear than if the rotor is only being rotated in one direction. Furthermore, the span of rotation is limited to 60 degrees (30 degrees clockwise and 30 degrees anticlockwise), thereby reducing wear of the motor and seals etc associated with rotation. The frequency of pressure pulses 5, 6 that can be generated also beneficially increases with a reduced span of rotation of the rotor and, as a result, the data acquisition rate is amplified.

It will be evident from the foregoing that provision of more rotor fluid openings 67, 167, 267a, 267b will reduce the span of rotation further, thereby increasing the speed of data transmission. The number of fluid openings in the rotor directly correlates to the speed of data transmission, however, the number of fluid openings is limited by the circumferential area of the rotor being able to accommodate the fluid openings whilst still maintaining enough structural stability. In order to accommodate more fluid openings if data transmission speed is an important factor, the size of the fluid openings can be decreased to allow for more fluid openings to be present on the rotor.

In alternative embodiments, the staged oscillation method can be used to generate a pattern of pressure pulses for other fluid pressure pulse generators than those shown in FIGS. 3 to 17. For example the staged oscillation method may be used to generate a first pressure pulse in position 1 and a second pressure pulse in position 2 whereby the first and second pressure pulse are substantially the same size. In this embodiment, the flow of fluid through fluid opening(s) in the rotor or stator of the fluid pressure pulse generator is the same or substantially the same in position 1 as in position 2 and is less than the flow of fluid through the fluid opening(s) in the start position. For example the stator may include two smaller flow chambers on either side of a larger flow chamber. A fluid opening in the rotor aligns with the larger flow chamber in the start position and aligns with one of the smaller flow chambers in position 1 and with the other smaller flow chamber in position 2. Alternatively, the stator may include wall sections on either side of a flow chamber, which wall sections align with the rotor fluid opening to reduce the flow of fluid therethrough in both positions 1 and 2. The innovative aspects of the invention apply equally in embodiments such as these.

Coupling Key

Referring now to FIGS. 18 to 21, the driveline coupling key 28 will now be described in more detail.

The driveline coupling key 28 securely couples the rotor 60, 160, 260 of the pulse generator 30, 230 to the driveshaft 24 of the pulser assembly 26. The driveline coupling key 28 comprises a key body 300 and a pair of zero backlash rings 302 which are seated in grooves 304 formed around the outer surface of the key body 300. As will be described in detail below, the zero backlash rings 302 create an interference fit between the driveshaft 24 and the rotating component (e.g. rotor 60, 160, 260) with zero backlash. Avoiding such backlash is desirable to reduce the risk of premature wear and fatigue of components and inaccurate telemetry caused by play between the driveline components.

The key body 300 has a generally rectangular cuboid shape similar to standard metal keys, and comprises two opposed major side faces, two opposed minor side faces, and two opposed end faces interconnected with the side faces. The dimension extending between the end faces is herein referred to as the length of the key body 300, the dimension extending between the minor side faces is herein referred to as the width of the key body 300, and the dimension extending between the major side faces is herein referred to as the depth of the key body 300. The edges between the side faces and the edges between the end and side faces are bevelled to provide some play around the edges to allow guided, tapered fitment of the coupling key 300 with the driveshaft 24 and rotor 60, 160, 260. The two grooves 304 extend around the side faces of the key body 300 and are spaced lengthwise across the key body 300 and in parallel to each other.

While two grooves 304 and two zero backlash rings 302 are shown in the Figures, a different number of grooves 304 and corresponding zero backlash rings 302 can be provided. Also, while bevelled edges are provided around all interconnecting side and edge faces, the key body 300 can feature fewer bevelled edges. Also, while the key body 300 has a generally rectangular cuboid shape with rectangular ends, it can have other shapes, such a cuboid with square ends, a cylinder with circular or oval ends, or elongated bodies with ends of various shapes, e.g. star or triangular shapes.

The driveshaft 24 of this embodiment comprises a distal keyhole 306 (not shown), that has a shape which is complimentary to the shape/geometry of the key, located on the side surface and at the distal end of the driveshaft 24, i.e. the downhole end. In this embodiment the keyhole 306 has a bore extending radially through the driveshaft and perpendicular to the axis of driveshaft; the bore has a rectangular cross-section with dimensions that are slightly larger than the minor face of the key body 300. The length of the keyhole 306 bore is less than the width of the key body 300, such that the key body 300 protrudes outwards from the keyhole 306 at both ends when inserted through the keyhole 306.

Alternatively but not shown, the bore of the keyhole 306 can extend at an angle to the driveshaft axis, and can extend fully or partially through the driveshaft 24.

As can be seen in FIGS. 4-10, 12 to 17 and 20, the rotor 60, 160, 260 is provided with a driveshaft receptacle 62, 162, 262 for receiving the driveshaft 24 and driveline coupling key 28, which has a cross-section resembling a circle bisected by a rectangle, which is configured to receive the axial end of the driveshaft and each end of the coupling key 28 that protrudes from the side surfaces of the driveshaft 24 (in the alternative embodiment where the keyhole bore only extends partially through the driveshaft, the receptacle only has a single rectangular portion for receiving the only one end of the coupling key 28 that protrudes from the keyhole 306). The dimensions and shape of the driveshaft receptacle 62, 162, 262 are selected to allow the driveshaft 24 and driveline coupling key 28 to be inserted into the rotor receptacle with only a small gap therebetween. The gap should be large enough to allow the coupling key to be freely inserted into the driveshaft keyhole and the rotor receptacle and small enough that the coupling body can fixedly couple the rotor 60, 160, 260 and driveshaft 24 together, allowing for less costly manufacturing methods and tolerancing of components.

The zero backlash rings 302 serve to eliminate any remaining gap between the coupling key 28 and the drive shaft keyhole 306, and between the driveline coupling key 28 and the rotor's driveshaft receptacle 62, 162, 262. The zero backlash rings 302 can be split rings or clips which fit into the grooves 304. The rings 302 are made of an elastically deformable/compressible material and have a thickness sufficient to cause the rings 302 to protrude from the side faces when the rings 302 are seated in the grooves 304, i.e. the rings 302 do not lie flush with the side faces of the key body 300. The zero backlash rings 302 in this embodiment can be suitably made of an elastically deformable/compressible thermoplastic material that will swell in the presence of heat (thermal expansion) as well as swell in the presence of liquid (moisture absorption expansion), e.g. the liquid of the drilling fluid.

The thermoplastic material is selected so that the zero backlash ring does not expand at surface ambient temperatures but will expand at a temperature that is within a typical downhole operating temperature range. This allows the coupling key to be assembled at or near the surface with the zero backlash ring 302 in its unexpanded state.

The portion of the zero backlash ring 302 protruding from the key body surfaces is slightly thicker than the gap between the key body 300 and the keyhole 306 and receptacle 62, 162, 262; the thermoplastic material is selected to have a compressibility and elasticity that allows the zero backlash rings 302 to compress enough that the coupling key can be inserted into the keyhole 306 and receptacle 62, 162, 262 yet expand to create an interference fit after the coupling key 28 has been inserted.

In an alternative embodiment, the zero backlash rings 302 can be composed of a shearable material, such as a glass-filled thermoplastic. In such case, excess material of the zero backlash rings 302 can shear off when the coupling key 28 is inserted into the keyhole 306 and receptacle 62, 162, 262, if the material does not possess sufficient compressibility to compress into the keyhole and receptacle.

In yet another embodiment, the zero backlash rings 302 can be composed of a plastically deformable material. In such case, excess material will "smear" as the zero backlash rings 302 are inserted into the keyhole and receptacle.

In each of the above alternative embodiments, the material for the zero backlash rings can still swell in presence of heat and/or liquid.

In yet another alternative embodiment, the zero backlash rings 302 can be sized to be essentially "size on size" instead of being thicker than the gap, such that the coupling key 302 can fit within the keyhole 306 and receptacle 62, 162, 262 to fill the gap without any compression, shearing, or smearing. For zero backlash rings 302 that are size on size, the material should be able to swell in the presence of heat and/or liquid to contribute to the interference fit.

Other materials other than a compressible thermoplastic can be selected for the zero backlash rings provided that such materials have at least one of the aforementioned properties of plastic deformability, shearability, elastic deformability/compressibility, thermal expansion, and moisture absorption expansion.

Assembly of the driveshaft 24, driveline coupling key 28 and rotor 60, 160, 260 will now be described. At surface ambient temperature and in the absence of liquid, the zero backlash rings 302 are in their unexpanded state, and are mounted onto the grooves 304 of the key body 300. The assembled driveline coupling key 28 is then inserted into the keyhole 306 of the driveshaft 24 with the minor side face of the coupling key 38 facing the bore of the keyhole 306. The axial end of the driveshaft 24 with the coupling key 28 is then inserted into the driveshaft receptacle 62, 162, 262 of the rotor 60, 160, 260. The rotor 60, 160, 260 is now coupled to the pulser assembly 26. The thermoplastic material of the zero backlash rings 302 compresses (or alternatively plastically deforms or shears) to fill the available gap between the driveline coupling key 28 and the key hole 306 and receptacle 62, 162, 262 respectively, thereby creating an interference fit. Once an interference fit is achieved, it is expected that backlash between the rotor 60, 160, 260 and driveshaft 24 will be reduced or eliminated altogether.

The coupled rotor 60, 160, 260 and pulser assembly 26 are then axially inserted inside the landing sub 27 until the rotor 60, 160, 260 makes contact with the stator and is fixed in the axial direction.

During normal downhole operation, the downhole ambient temperature is elevated over the surface ambient temperature thereby causing the zero backlash rings 302 to expand more than the surrounding components (rotor, driveline, etc). Also, fluid from the flowing mud makes contact with the zero backlash rings 302 also causing the zero backlash rings 302 to swell. This thermal expansion and swelling is expected to ensure that the interference fit between the rotor 60, 160, 260 and drive shaft 24 is maintained.

Additional coupling keys (not shown) can be used in the pulser assembly 26; any drive-line connection between components, such as the driveshaft to gearbox, gearbox to motor can use the driveline coupling key 28 thereby reducing or eliminating backlash between components. For example, a second coupling key (mechanical stop coupling key 310) is provided in proximity to the mechanical stop sub-assembly as will be described in detail below.

With reduced or eliminated backlash, it is expected that fatigue loading on the drive-line will be reduced or minimized, and rotor position uncertainty will be mitigated. In other words, by reducing or eliminating backlash between the rotor 60, 160, 260 and the driveshaft 24, the rotor position is expected to be more consistent and accurate, thereby providing more reliable and accurate mud pulse signal transmission to the surface.

Mechanical Stop

Referring now to FIGS. 22 to 23 there is illustrated a first embodiment of a mechanical stop sub-assembly 312 of the pulser assembly 26 which provides a simple and reliable means for a motor and gearbox of the pulser assembly 26 to precisely locate and position the rotor 60, 160, 260 relative to the stator 40, 240. In particular, it is expected that the mechanical stop sub-assembly 312 can provide a mechanical substitute to the use of position sensing electronics such as Hall sensors which are vulnerable to damage in an operating environment that is harsh to electronics.

The mechanical stop sub-assembly 312 comprises a mechanical stop collar 314 that is mounted at the distal end of the cylindrical housing of the motor and gearbox sub assembly 25. A motor and associated gearbox (not shown) are located inside the housing and rigidly affixed relative to the housing. A driveline input indexing tooth 316 protrudes in an axial direction from the distal end of the cylindrical housing and mates with a notch on the mechanical stop collar 314; this serves to affix and precisely position the mechanical stop collar 314 relative to the motor and gearbox sub assembly 25 and hence the gearbox and motor.

The mechanical stop collar 314 comprises an angular movement restrictor window comprising a central window segment 317 for rotatably receiving the driveshaft 24, flanked by two 180° opposed indexing window segments 318 that allow ends of the mechanical stop coupling key 310 protruding from the driveshaft 24 to oscillate within the indexing window segments 318. The angular span a of each indexing window segment 318 is selected to correspond to the desired range of oscillation desired for the rotor 60, 160, 260 that provides a full range of motion between pulses. In this embodiment, the angular span is 60° for both indexing window segments 318, which provides the rotor 60, 160, 260 with the angular range required to rotate between Positions 1 and 2 as discussed above under heading "Stage oscillation method". However, should the rotor 60, 160, 260 be designed to rotate across a different angular range, the angular span of the indexing window segment can be adjusted accordingly.

The driveshaft 24 comprises a mechanical stop keyhole (not shown) that is located along the driveshaft 24 at a position that axially aligns with the mechanical stop collar 314. The mechanical stop coupling key 310 extends through the mechanical stop keyhole and can have the same features as the driveline coupling key 28 to reduce or eliminate backlash. In this embodiment, the mechanical stop coupling key 310 also engages the gearbox such the gearbox is coupled to the driveshaft 24 in a manner similar to how the rotor 60, 160, 260 is coupled to the driveshaft 24; therefore, the mechanical stop coupling key 310 serves as a coupling means to couple the driveshaft 24 and gearbox, as well as a rotor positioning and indexing means ("indexer") as will be described in detail below. In an alternative embodiment, another coupling key (not shown) is provided to couple the gearbox to the driveshaft 24 in which case the mechanical stop coupling key 310 serves only as an indexer.

The coupling key 310 serves as an indexer by being constrained to oscillate between the angular span a defined by the indexing window segments 318; in other words, movement of the coupling key 310 within the indexing window segments 318 provide a mechanical indication of an angular movement limit. When the coupling key 310 contacts one side of an indexing window segment 318, the rotor 60, 160, 260 will be positioned at Position 1, i.e. rotated 30 degrees counter-clockwise from the full flow configuration position ("zero degree" position) to the intermediate flow position (Position 1). Similarly, when the coupling key contacts the opposite side of the indexing window segment 318, the rotor 60, 160, 260 will be positioned at Position 2, i.e. rotated 30 degrees clockwise from the zero degree full flow configuration position to the reduced flow position (Position 2). (As the two indexing window segments are 180° apart and have the same angular span a, contact by one end of the coupling key 310 against one side of an indexing window segment 318 should result in the other end of the coupling key 310 contacting the opposite side of the other indexing window segment 318). Alternatively, different angular positions can be selected, such as 30 degrees clockwise from the 0 degree position and then 30 degrees counter-clockwise from the 0 degree position, or just 30 degrees clockwise and back to the 0 degree position in the case of a single stage stator.

The angular movement range defined by the indexing window segments 318 also provides for means for determining the centre point of the angular range, which corresponds to the zero degree/full flow configuration position of the rotor 60, 160, 270. The driveshaft 24 can be readily positioned at the zero degree position by programming the sensing and motor control equipment (located in a benign environment) to cause the motor to move the indexer to the mid-point of the indexing window segment 318, i.e. move 30° towards the centre (i.e. half of the angular span) after the mechanical stop coupling key has made contact with each side of the indexing window segment 318. The sensing and motor control equipment thus comprises a processor and a memory encoded with instructions executable by the processor to move the motor in this manner and monitor motor current feed rate which indicates when contact is made. This provides a simple approach to calibrate the driveshaft 24 angular position at the gearbox output after each or multiple series of oscillations, with the indexer providing angular movement feedback and without the need for electronic sensors and associated circuitry to track the angular position of the driveshaft 24. More particularly, the memory is encoded with a program that when executed by the processor performs a calibration method that comprises: rotating the driveshaft in a first direction such that the indexer contacts a first side of the indexing window segment representing one end of the angular span; rotating the driveshaft in the opposite direction until the indexer contacts a second side of the indexing window segment representing the opposite end of the angular span; determining a calibration position of the indexer by selecting an angular position that is a selected angular distance from the second side of the indexing window segment; and positioning the indexer at the calibration position by rotating the indexer from the second side of the window segment by the selected angular distance. While in this embodiment the calibration position is the midpoint of the angular span (60 degrees) and the selected angular distance is 30 degrees, another calibration position and corresponding angular distance can be selected. Accordingly, it is expected that the rotor 60, 160, 260 can be accurately and reliably positioned relative to the stator 40, 240 at its full flow, intermediate flow, and low flow positions by this calibration method.

Further, the processor can be programmed with the angular span value (which in this embodiment is 60 degrees) and to record a fault when the distance traveled by the indexer during calibration does not match the stored angular span value; such lack of match can occur for example when some part of the driveline is jammed and the indexer is unable to traverse the entire angular span.

FIG. 24 illustrates an alternative embodiment of the mechanical stop sub-assembly. In this embodiment, The mechanical stop keyhole and coupling key 310 are replaced by a pair of indexing teeth 320 that are formed directly on the driveshaft 24, e.g. by machining out angular portions of the driveshaft 24 on each side of each indexing tooth 320 to define a smaller diameter circular pin 322 which is rotatable within the central window segment 317 of the mechanical stop collar 314. The indexing window segments are reshaped and resized to accommodate the different shape of the indexing teeth 320 such that the angular movement of the indexing teeth 320 remains 60°.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the general concept.

The invention claimed is:

1. A coupling key for fixedly coupling a driveshaft to a rotating component of a measurement while drilling telemetry apparatus, the driveshaft having a keyhole configured to receive a portion of the coupling key and comprising a bore extending from a side of the driveshaft and at least partially through the driveshaft, and the rotating component having a receptacle configured to axially receive the driveshaft and a portion of the coupling key protruding outwardly from the driveshaft keyhole, the coupling key comprising:
   a key body having dimensions selected to fit within the keyhole and receptacle with a gap that is large enough that the key body can be freely inserted into the keyhole and receptacle and small enough that the coupling key can couple the driveshaft to the rotating component in a rotational direction; and
   at least one zero backlash ring extending around the key body and protruding from surfaces of the key body and into the gap such that an interference fit is established between the coupling key, the keyhole, and the receptacle when the coupling key is coupling the driveshaft and rotating component together.

2. A coupling key as claimed in claim 1 further comprising at least one groove extending around the key body and wherein the at least one zero backlash ring is seated in the groove with a portion of the zero backlash ring protruding outwardly from the groove.

3. A coupling key as claimed in claim 2 comprising at least two grooves and at least two zero backlash rings with each zero backlash ring seated in a respective groove.

4. A coupling key as claimed in claim 1 wherein the dimension of the zero backlash ring protruding from the surfaces of the key body is larger than the gap, and the zero backlash ring is composed of a thermoplastic material that is elastically deformable and which swells in the presence of heat or moisture or both heat and moisture, whereby the zero backlash ring can compress to permit the coupling key to be inserted into the keyhole and receptacle and expand to form the interference fit after the coupling key has been inserted into the keyhole and receptacle.

5. A coupling key as claimed in claim 1 wherein the dimension of the zero backlash ring protruding from the surfaces of the key body is larger than the gap, and the zero backlash key is composed of a material that is plastically deformable.

6. A coupling key as claimed in claim 5 wherein the zero backlash ring is composed of a material which swells in the presence of heat or moisture or both heat and moisture.

7. A coupling key as claimed in claim 1 wherein the dimension of the zero backlash ring protruding from the surfaces of the key body is larger than the gap, and the zero backlash key is composed of a material that is shearable.

8. A coupling key as claimed in claim 1 wherein the dimension of the zero backlash ring protruding from the surfaces of the key body is the same size as the gap and the zero backlash ring is composed of a material which swells in the presence of heat or moisture or both heat and moisture.

9. A coupling key as claimed in 1 wherein the rotating component is selected from the group consisting of a rotor of a fluid pressure pulse generator and a gearbox for a motor of a pulser assembly.

10. A measurement while drilling telemetry apparatus comprising
   (a) a pulser assembly comprising a motor, a driveshaft rotationally coupled to the motor, and sensor and motor control equipment communicative with the motor;
   (b) a fluid pressure pulse generator comprising a stator for fixedly coupling to a landing sub, and a rotor; and
   (c) a driveline coupling key fixedly coupling the driveshaft to the rotor,
   wherein the driveshaft comprises a keyhole configured to receive a portion of the coupling key and comprising a bore extending from a side of the driveshaft and at least partially through the driveshaft,
   wherein the rotating component comprises a receptacle configured to axially receive the driveshaft and a portion of the coupling key protruding outwardly from the driveshaft keyhole, and
   wherein the driveline coupling key comprises:
      a key body having dimensions selected to fit within the keyhole and receptacle with a gap that is large enough that the key body can be freely inserted into the keyhole and receptacle and small enough that the key body can couple the driveshaft to the rotating component in a rotational direction; and at least one zero backlash ring extending around the key body and protruding from surfaces of the key body and into the gap such that an interference fit is established between the coupling key, the keyhole, and the receptacle when the coupling key is coupling the driveshaft and rotating component together.

11. An apparatus as claimed in claim 10 further comprising a coupling key as claimed in claim 2.

12. A measurement while drilling telemetry apparatus comprising:
(a) a pulser assembly comprising: a housing; a motor fixedly coupled to the housing; a driveshaft rotationally coupled to the motor; sensor and motor control equipment communicative with the motor; and a mechanical stop sub-assembly comprising: a collar fixedly coupled to the housing and an indexer protruding from a side of the driveshaft, the collar comprising an angular movement restrictor window with a central window segment which axially and rotatably receives the driveshaft, and an indexing window segment in communication with the central window segment and which receives the indexer, the indexing window segment having an angular span across which the indexer can be oscillated by the driveshaft, wherein the indexer is a coupling key coupling the driveshaft to a gearbox of the motor, the driveshaft having a keyhole and the gearbox having a receptacle, and the coupling key having a key body with dimensions which extend through the keyhole and receptacle and into the indexing window segment; and
(b) a fluid pressure pulse generator comprising a stator for affixing to a landing sub, and a rotor fixedly attached to the driveshaft such that the angular span of the indexing window segment defines the angular range of the rotor's angular movement relative to the stator.

13. An apparatus as claimed in claim 12 wherein the angular movement restrictor window comprises a pair of opposed indexing window segments and the coupling key extends from the driveshaft into the opposed indexing window segments.

14. An apparatus as claimed in claim 12 wherein the coupling key comprises at least one zero backlash ring extending around the key body and protruding from surfaces of the key body and into a gap in between the key body and the keyhole and receptacle, such that an interference fit is established between the coupling key, the keyhole, and the receptacle when the coupling key is coupling the driveshaft and gearbox together.

15. An apparatus as claimed in claim 12 wherein the annular span is 60 degrees.

16. An apparatus as claimed in claim 12 wherein the sensor and motor control equipment comprises a processor and a memory having encoded thereon a program executable by the processor to perform a calibration method comprising rotating the driveshaft such that the indexer contacts a side of the indexing window segment representing one end of the angular span; determining a calibration position of the indexer by selecting an angular position that is a selected angular distance from the contacted side of the indexing window segment; and positioning the indexer at the calibration position by rotating the indexer from the contacted side of the window segment by the selected angular distance.

17. A measurement while drilling telemetry apparatus comprising:
(a) a pulser assembly comprising: a housing; a motor fixedly coupled to the housing; a driveshaft rotationally coupled to the motor; sensor and motor control equipment communicative with the motor; and a mechanical stop sub-assembly comprising: a collar fixedly coupled to the housing and an indexer protruding from a side of the driveshaft, the collar comprising an angular movement restrictor window with a central window segment which axially and rotatably receives the driveshaft, and an indexing window segment in communication with the central window segment and which receives the indexer, the indexing window segment having an angular span across which the indexer can be oscillated by the driveshaft, wherein the indexer comprises: a key body with dimensions which extend through a keyhole in the driveshaft and into the indexing window segment; and at least one zero backlash ring extending around the key body and protruding from surfaces of the key body and into a gap in between the key body and the keyhole, such that an interference fit is established between the key body and the keyhole when the key body is received in the keyhole; and
(b) a fluid pressure pulse generator comprising a stator for affixing to a landing sub, and a rotor fixedly attached to the driveshaft such that the angular span of the indexing window segment defines the angular range of the rotor's angular movement relative to the stator.

18. A mechanical stop sub-assembly for a pulser assembly of a measurement while drilling telemetry apparatus, the sub-assembly comprising:
a collar fixedly mountable to a housing of the pulser assembly; and
an indexer fixedly mountable to a driveshaft of the pulser assembly such that a portion of the indexer protrudes from a side of the driveshaft, the indexer comprising a coupling key for coupling the driveshaft to a gearbox of a motor of the pulser assembly,
wherein the collar comprises an angular movement restrictor window with a central window segment for axially and rotatably receiving the driveshaft, and an indexing window segment in communication with the central window segment and which receives the protruding indexer portion when the driveshaft is being received by the central window segment, the indexing window segment having an angular span across which the indexer can be oscillated by the driveshaft; the angular span selected to define an angular range of a rotor's angular movement relative to a stator, and wherein the rotor and stator are part of a fluid pressure pulse generator of the measurement while drilling telemetry apparatus and the rotor is affixed to the driveshaft, and wherein the coupling key has a key body with dimensions which extend through a keyhole in the driveshaft and receptacle in the gearbox and into the indexing window segment.

19. A sub-assembly as claimed in claim 18 wherein the angular movement restrictor window comprises a pair of opposed indexing window segments and the coupling key extends from the driveshaft into the opposed indexing window segments.

20. A sub-assembly as claimed in claim 18 wherein the coupling key comprises at least one zero backlash ring extending around the key body and protruding from surfaces of the key body and into a gap in between the key body and the keyhole and receptacle, such that an interference fit is established between the coupling key, the keyhole, and the receptacle when the coupling key is coupling the driveshaft and gearbox together.

21. A sub-assembly as claimed in claim 18 wherein the angular span is 60 degrees.

22. A mechanical stop sub-assembly for a pulser assembly of a measurement while drilling telemetry apparatus, the sub-assembly comprising:

a collar fixedly mountable to a housing of the pulser assembly; and an indexer fixedly mountable to a driveshaft of the pulser assembly such that a portion of the indexer protrudes from a side of the driveshaft, wherein the collar comprises an angular movement restrictor window with a central window segment for axially and rotatably receiving the driveshaft, and an indexing window segment in communication with the central window segment and which receives the protruding indexer portion when the driveshaft is being received by the central window segment, the indexing window segment having an angular span across which the indexer can be oscillated by the driveshaft; the angular span selected to define an angular range of a rotor's angular movement relative to a stator, and wherein the rotor and stator are part of a fluid pressure pulse generator of the measurement while drilling telemetry apparatus and the rotor is affixed to the driveshaft, and wherein the indexer comprises: a key body with dimensions which extend through a keyhole in the driveshaft and into the indexing window segment; and at least one zero backlash ring extending around the key body and protruding from surfaces of the key body and into a gap in between the key body and the keyhole, such that an interference fit is established between the key body and the keyhole when the key body is received in the keyhole.

* * * * *